(12) United States Patent
Iandolino et al.

(10) Patent No.: US 11,982,627 B2
(45) Date of Patent: May 14, 2024

(54) SYSTEMS AND METHODS FOR QUANTITATIVE PHENOTYPE ANALYSIS

(71) Applicant: Monsanto Technology LLC, St. Louis, MO (US)

(72) Inventors: Alberto B. Iandolino, Davis, CA (US); Andrew Walter Mroczka, Sacramento, CA (US); Rick C. Taytroe, Sacramento, CA (US)

(73) Assignee: Monsanto Technology LLC, Saint Louis, MO (US)

( * ) Notice: Subject to any disclaimer, the term of this patent is extended or adjusted under 35 U.S.C. 154(b) by 903 days.

(21) Appl. No.: 16/966,822

(22) PCT Filed: Jan. 29, 2019

(86) PCT No.: PCT/US2019/015687
§ 371 (c)(1),
(2) Date: Nov. 16, 2020

(87) PCT Pub. No.: WO2019/152424
PCT Pub. Date: Aug. 8, 2019

(65) Prior Publication Data
US 2021/0310954 A1 Oct. 7, 2021

Related U.S. Application Data

(60) Provisional application No. 62/624,198, filed on Jan. 31, 2018.

(51) Int. Cl.
*G06T 7/70* (2017.01)
*G01N 21/64* (2006.01)
(Continued)

(52) U.S. Cl.
CPC ......... *G01N 21/84* (2013.01); *G01N 21/6456* (2013.01); *G01N 21/6486* (2013.01);
(Continued)

(58) Field of Classification Search
CPC .............. G01N 21/84; G01N 21/6456; G01N 21/6486; G01N 21/8422;
(Continued)

(56) References Cited

U.S. PATENT DOCUMENTS

2005/0192760 A1 9/2005 Dunlap
2006/0109900 A1* 5/2006 Shen .................... H04N 19/136
375/240.03

(Continued)

OTHER PUBLICATIONS

International Search Report and Written Opinion for PCT/US2019/15687 dated Apr. 15, 2019, 9 pages, United States.

*Primary Examiner* — Ali Bayat
(74) *Attorney, Agent, or Firm* — Harness, Dickey & Pierce, P.L.C.

(57) ABSTRACT

Semi-automated quantitative phenotype analysis of organisms, such as plant organisms, bacterial organisms, and the like. An imaging system, image capture specifications, a semi-automated quantitative image analysis process, and automated batch processing of acquired images that enables completely quantitative experimental readouts that produces data rapidly and objectively.

21 Claims, 33 Drawing Sheets

(51) Int. Cl.
  *G01N 21/84* (2006.01)
  *G06F 18/22* (2023.01)
  *G06K 7/14* (2006.01)
  *G06T 7/00* (2017.01)
  *H04N 23/56* (2023.01)
  *H04N 23/73* (2023.01)

(52) U.S. Cl.
  CPC ......... *G01N 21/8422* (2013.01); *G06F 18/22* (2023.01); *G06K 7/1413* (2013.01); *G06K 7/1443* (2013.01); *G06T 7/0012* (2013.01); *G06T 7/70* (2017.01); *H04N 23/56* (2023.01); *H04N 23/73* (2023.01); *G01N 2021/8466* (2013.01); *G01N 2201/126* (2013.01); *G06T 2207/30024* (2013.01)

(58) Field of Classification Search
  CPC ...... G01N 2021/8466; G01N 2201/126; G06F 18/22; G06K 7/1413; G06K 7/1443; G06T 7/0012; G06T 7/70; G06T 2207/30024; H04N 23/56; H04N 23/73
  USPC ...................................................... 382/224
  See application file for complete search history.

(56) References Cited

U.S. PATENT DOCUMENTS

| | | | |
|---|---|---|---|
| 2008/0232079 A1* | 9/2008 | Awazu | H04N 23/56 362/3 |
| 2012/0288854 A1* | 11/2012 | Deppermann | G01N 15/1463 435/410 |
| 2013/0130368 A1* | 5/2013 | Babico | G01N 15/14 422/534 |
| 2014/0219538 A1 | 8/2014 | Guthrie et al. | |
| 2016/0100437 A1* | 4/2016 | Armstrong | H04W 4/023 370/249 |
| 2023/0243756 A1* | 8/2023 | Nicole | A01G 7/00 356/448 |

\* cited by examiner

SYSTEMS AND METHODS FOR QUANTITATIVE PHENOTYPE ANALYSIS

TECHNICAL FIELD

Aspects of the present disclosure generally relate to imaging organisms, and more particularly to systems and methods for semi-automated quantitative phenotype analysis of organisms.

BACKGROUND

Conventional visual phenotyping techniques use marker genes to facilitate and expedite research in plant systems. The experimental readout from these techniques typically requires a manual, subjective assessment of phenotype that is labor intensive, expensive, time consuming, and prone to scorer biases. Exemplary conventional techniques include quantitative reverse-transcriptase PCR (qRT-PCR) and QuantiGene that assess phenotypes associated with particular plant target genes. In addition to being labor intensive, time consuming, and expensive, these techniques are also prone to assay artifacts. Additionally, other conventional techniques may be subjective or prone to scorer bias.

SUMMARY

Aspects of the systems and methods described herein include an imaging system, image capture specifications, a semi-automated quantitative image analysis process, and automated batch processing of acquired images that enables completely quantitative experimental readouts that produces data rapidly and objectively.

In an aspect, a system includes a frame assembly, a light source, an imaging device, and at least one processor. The light source is mechanically coupled to the frame assembly and configured to illuminate an organism. The imaging device is also mechanically coupled to the frame assembly and configured to capture images of the illuminated organism. The processor is communicatively coupled to the imaging device and configured to quantitatively analyze phenotypes of the organism that are visible within the captured images.

In other aspects, a method and a computer readable storage device are provided.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1A:
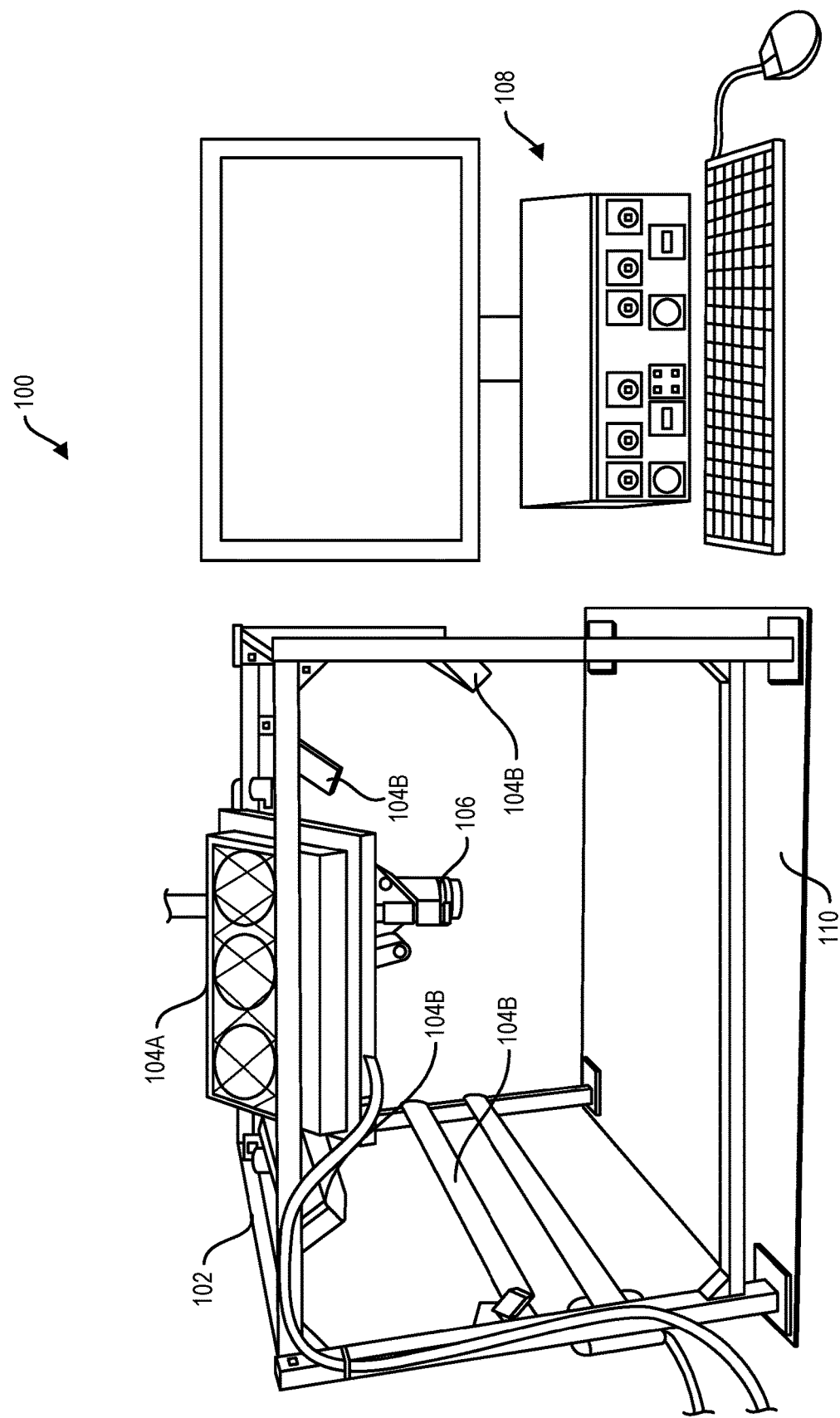
FIGS. 1A-1E illustrate an exemplary imaging system in accordance with an embodiment.
Figure 1B:
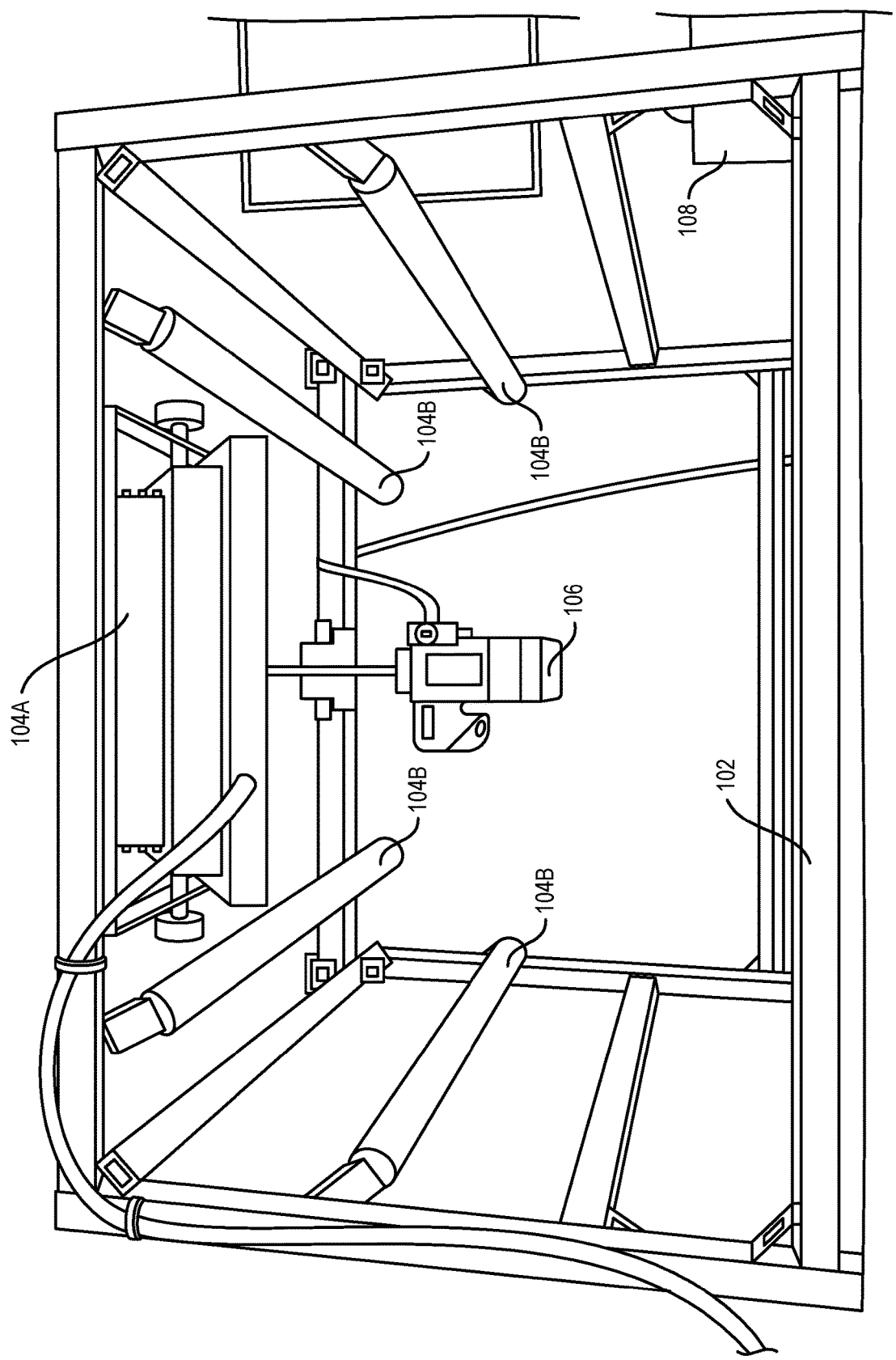
Figure 1C:
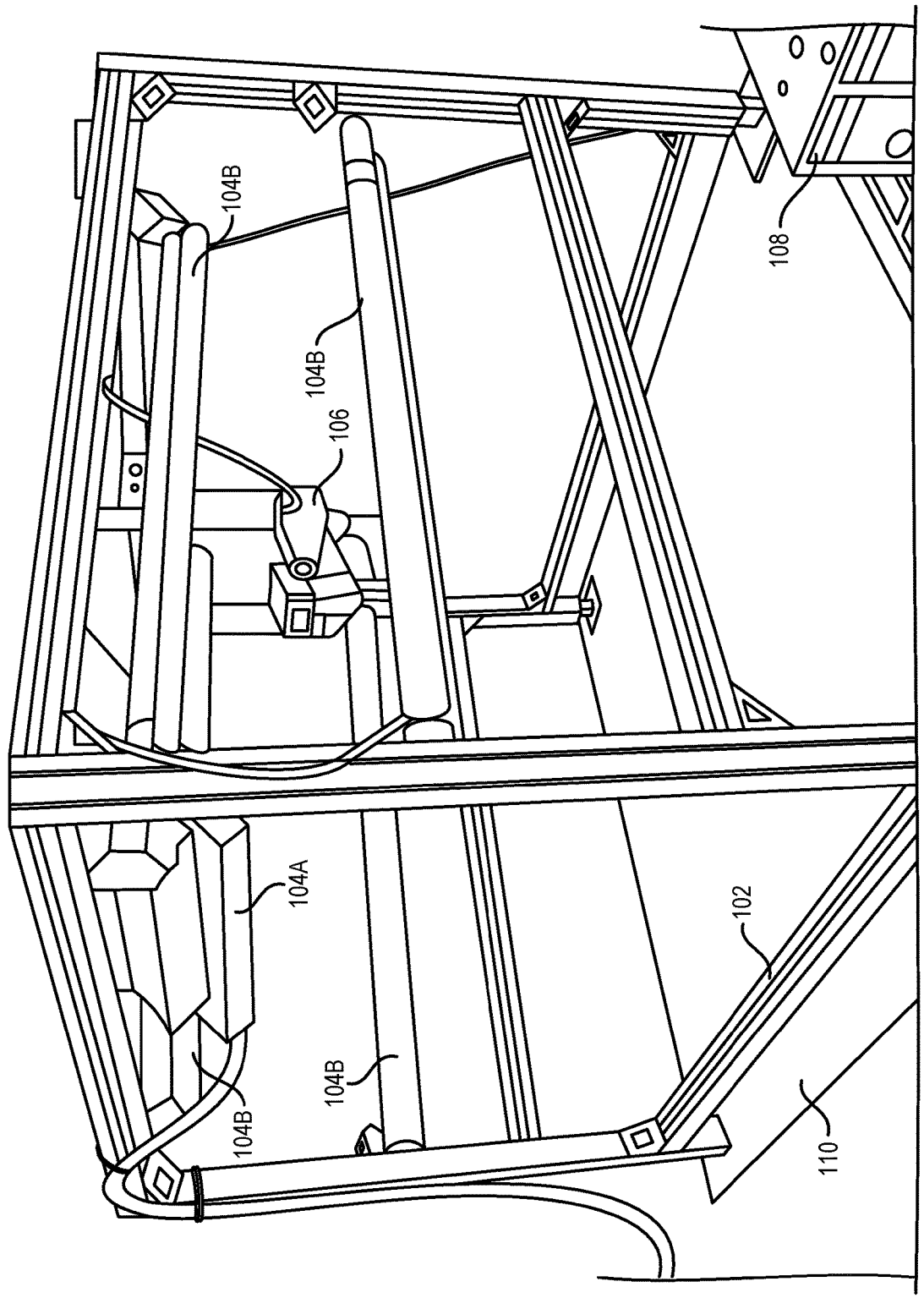
Figure 1D:
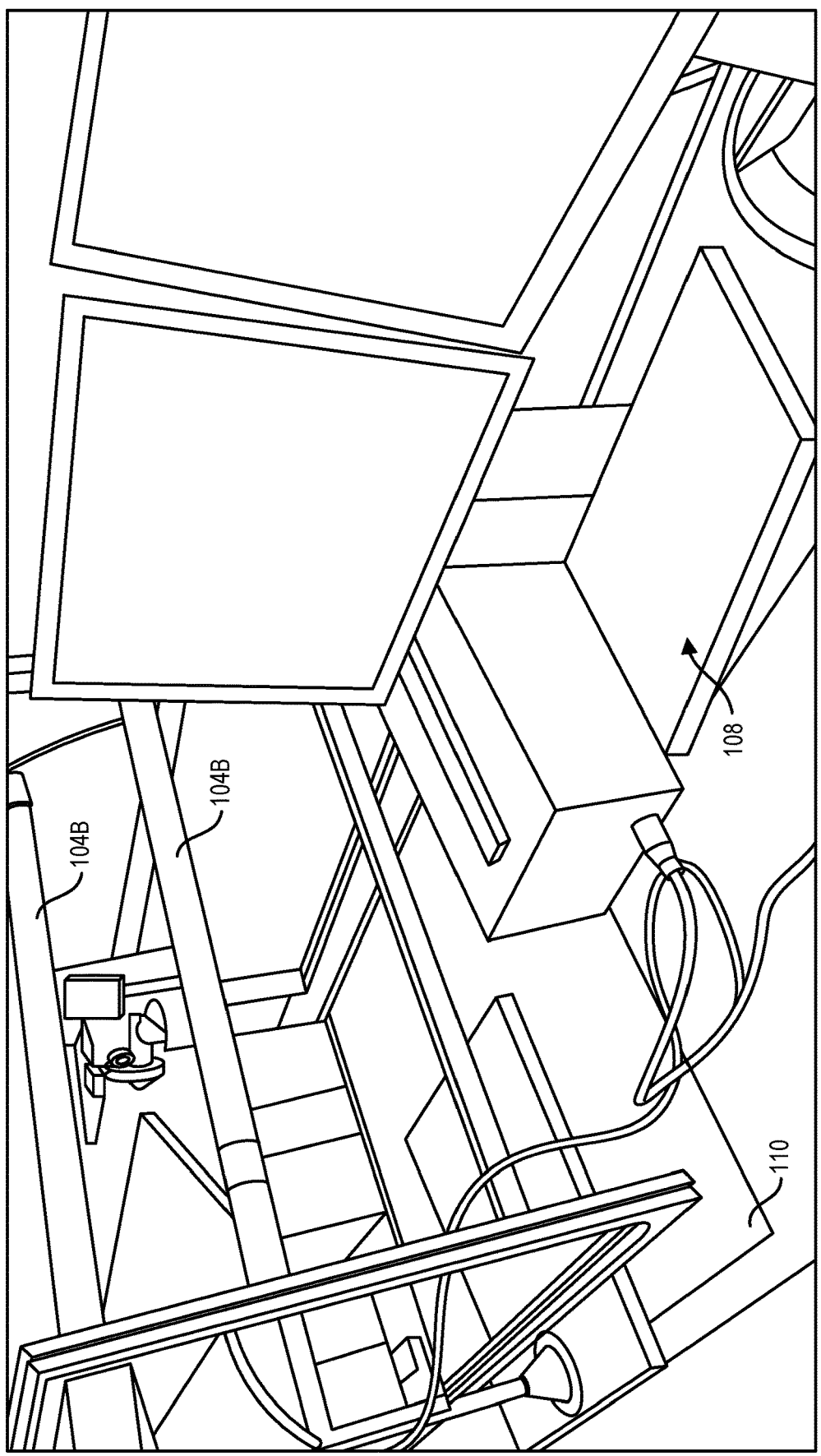
Figure 1E:
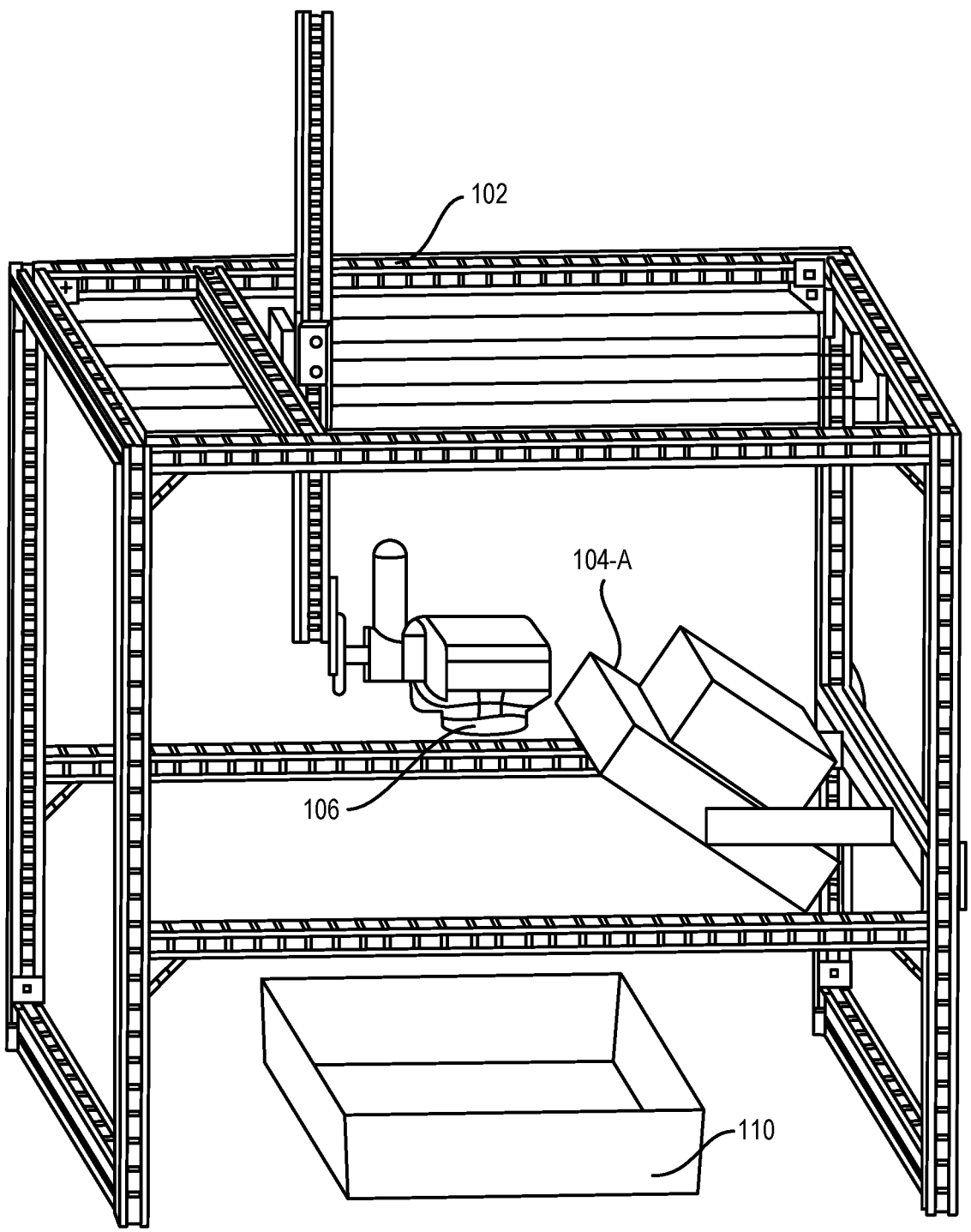

Aspects of the systems and methods described herein include an imaging system, image capture specifications, and image analysis via semi-automated batch processing of acquired images that enables completely quantitative experimental readouts that produces data rapidly and objectively. Beneficially, the systems and methods described herein provide a rapid (e.g., same-day turnaround), accurate, robust (e.g., consistent experiment-to-experiment), inexpensive (e.g., virtually no ongoing operations cost) quantitative assay readout using imaging, that can be quickly and visually quality controlled. In an embodiment, the systems and methods may be at least semi-automated.

In an embodiment, the imaging system and methods enable image capture and image analysis of visible plant foliar phenotypes yielding a quantitative readout from research efforts to elicit a visible phenotype in plants. The systems and methods described herein result in an inexpensive, objective, quantitative data readout from experiments targeting exogenous or endogenous plant genes resulting in a visible phenotype. These systems and methods may be used to assess relative efficacy of formulations or transgenes being tested for up-regulation or down-regulation of a target gene of interest to prioritize them for follow-up testing and optimizations. By utilizing computer scripts (e.g., a processor executing processor-readable instructions, etc.) that at least semi-automate batch image processing, the systems and methods are scalable to analyze a plurality (e.g., up to and including hundreds or thousands) of images at a time.

The systems and methods described herein have been successfully applied to quantification of visible foliar Green Fluorescent Protein (GFP) and magnesium chelatase silencing in *Nicotiana benthamiana* and *Solanum lycopersicum* (tomato) plant seedlings, but are not limited to such applications. Other applications that have already been reduced to practice include detection of pathogen presence and percent affected area on *Nicotiana tabaccum* (tobacco) leaves and/or other plant species, *Xanthomonas hortorum* pv. *carotae* colony identification and colony count on bacterial plates, indiscriminate bacterial colony percent area coverage to identify overgrown/unreadable bacterial plates, counting and sizing carrots, and detection of cavity spot pathogen presence and percent area affected on carrots, all for quality control of vegetable and vegetable seed stocks against known pathogens. In addition, the systems and methods described herein may be utilized to measure necrotic tissue induced by application of herbicides, for example.

Imaging Hardware

Referring now to FIGS. 1A-1E, an exemplary imaging system, generally indicated at 100, within which an embodiment of the disclosure may be incorporated is illustrated. The imaging system 100 includes a frame assembly 102, one or more light sources 104, an imaging device 106, and a computing device 108. In an embodiment, the frame assembly 102 is located upon a template 110. The light sources 104 and the imaging device 106 are each mechanically coupled to the frame assembly 102. The imaging device 106 is communicatively coupled to the computing device 108. In an embodiment, the light sources 104 are also communicatively coupled to the computing device 108. The communicative coupling may be via any telecommunications network that facilitates the exchange of data, such as those that operate according to the IEEE 802.3 (e.g., Ethernet), the IEEE 802.11 (e.g., Wi-Fi), and/or the IEEE 802.15 (e.g., Bluetooth) protocols, for example. Additionally, or alternatively, the communicative coupling may be achieved via any medium that allows data to be physically transferred through serial or parallel communication channels (e.g., copper, wire, optical fiber, computer bus, wireless communication channel, radio frequency link, etc.). The light sources 104, the imaging device 106, and the computing device 108 are electrically coupled to a power source (not shown). The imaging system 100 may be referred to as an imaging station, an image capture station, and/or an imaging apparatus in accordance with one or more embodiments of the disclosure.

In an embodiment, the imaging system 100 enables fluorescent-light imaging of a Green Fluorescent Protein (GFP) marker gene in whole plants or dissected plant parts and white-light imaging of other visible plant traits and/or readouts of interest.

The frame assembly 102 is a rigid structure comprised of members adapted and arranged to surround an organism and provide support to the light sources 104 and imaging device 106. In an embodiment, frame assembly 102 is comprised of the parts listed in Table 1.

TABLE 1

| Description | Quantity | Manufacturer | Part Number |
|---|---|---|---|
| Aluminum Gusseted Corners, 1 in. × 1 in. | 25 | Frame-World | 11-160 |
| Aluminum Corner Angle Brackets, 1 in. × 1 in. | 8 | Frame-World | 11-001 |
| Plastic (e.g., ABS) End Caps, 1 in. × 1 in. | 4 | Frame-World | 11-250 |
| Button Head Cap Screws-¾ in. | 4 | Frame-World | 11-233 |
| Button Head Cap Screws-½ in. | 70 | Frame-World | 11-231 |
| Heavy Duty T-nut, ¼-20 thd (Steel, Zinc plated) | 74 | Frame-World | 11-205 |
| Single Mount Linear Bearing with Locking Handle | 1 | Frame-World | 11-93LH |
| Aluminum Joining Plate | 2 | Frame-World | 11-044 |
| 1 in. × 1 in. Aluminum Extrusion, 21.00 in. length | 4 | Frame-World | EX-11-21.00 |
| 1 in. × 1 in. Aluminum Extrusion, 28.00 in. length | 6 | Frame-World | EX-11-28.00 |
| 1 in. × 1 in. Aluminum Extrusion, 24.00 in. length | 4 | Frame-World | EX-11-24.00 |

The light sources 104 are configured to illuminate organisms under evaluation. In an embodiment, the light source 104-A includes a light-emitting diode (LED) panel configured to emit light having a generally blue color (e.g., electromagnetic radiation with a wavelength from about 425 nm to about 495 nm). An exemplary light source 104-A includes a SL3500D LED light panel available from Photon Systems Instruments, which has dimensions of 20 centimeters by 30 centimeters and emits 447 nanometer blue royal light with a maximum intensity of 3000 microEinsteins. In an additional or alternative embodiment, the light sources 104-B are LED tubes configured to emit white light. An exemplary light source 104-B includes a plurality (e.g., four) of AR-T8610FR/40 LED tubes (e.g., 2' T8, 10 W, 110-277V, 4000K, frosted diffuser) available from Aurora. In an embodiment, LED tubes comprising light source 104-B each rotate within their base, allowing adjustment in increased uniformity of illumination across the useful imaging area, for example. Additionally, light source 104-B may further include a plurality (e.g., four) 5C403 lamp holders (e.g., 660 W) available from Leviton and an 5M557240 electrical switch box with switch available from Mono Systems.

The imaging device 106 is configured capture images of organisms under evaluation. In an embodiment, imaging device 106 is an EOS 70D digital SLR camera (e.g, part number 84696002) available from Canon. In an embodiment, imaging device 106 further includes an ACK-E6 AC Adapter Kit (e.g., part number 33516002) available from Canon. For example, imaging device live preview on the processor monitor may rapidly deplete battery charge, and thus the adapter kit reduces battery charging frequency. In another embodiment, imaging device 106 further includes an 18-55 mm f3.5-5.6 IS II camera lens (e.g., part number 20426002) available from Canon. In additional embodiments, imaging device 106 includes a Yellow #12 glass camera filter (58 mm) (e.g., part number 58Y12) and a Green #11 glass camera filter (58 mm) (e.g., part number 5811G1), both available from Tiffen. In an embodiment, the filters remove excitation light from the 447 nm blue LED light source for GFP excitation and visualization. Short-wavelength blue LED excitation source light scatters readily, thereby decreasing image resolution and contrast. Therefore, selective removal of excitation light while retaining full transmittance during filtration of light emitted by GFP are essential to quantitative image analysis systems and methods described herein.

The template 110 is configured to provide a non-reflective, high-contrast background for the captured images of the organisms under evaluation. Exemplary templates 110 include acrylic sheets having a P95 matte finish (e.g., to reduce glare) and ⅛ inch thickness available from Tapp Plastics. In an embodiment, the sheets may have dimensions of 32 inches by 32 inches (81.28 cm by 81.28 cm) (i.e., "larger sheets") and in another embodiment the sheets may have dimensions of 16 inches by 10$^{11}$/$_{16}$ inches (40.64 cm by 27.15 cm) (i.e., "smaller sheets"). The template 110 may include evenly spaced row and column gridlines to enable imaging a plurality of organisms at one time and automated parsing into individual organism images in accordance with one or more embodiments of the disclosure. For example, smaller sheets may serve the above purpose and larger sheets may serve as a base for imaging system 100. In an embodiment, the smaller sheets are sized to a 3:2 aspect ratio, matching the native aspect ratio of imaging device 106.

The computing device 108 is configured quantitatively analyze one or more phenotypes of organisms under evaluation that are visible in images captured by the imaging device 106. Additionally or alternatively, computing device 108 may be configured to control operation of the light sources 104 and/or the imaging device 106. In an embodiment, the computing device 108 controls exposure settings (e.g., aperture, shutter speed, ISO, white balance, resolution, etc.) of the imaging device 106. For example, the controls of imaging device 106 may not be readily accessible because the imaging device 106 is mounted on the frame assembly 102. In a further embodiment, the computing device 108 renders on its display device a live preview of an image to be captured. For example, a display device of computing device 108 may have greater resolution than what is available on a display device of the imaging device 106.

Figure 2:
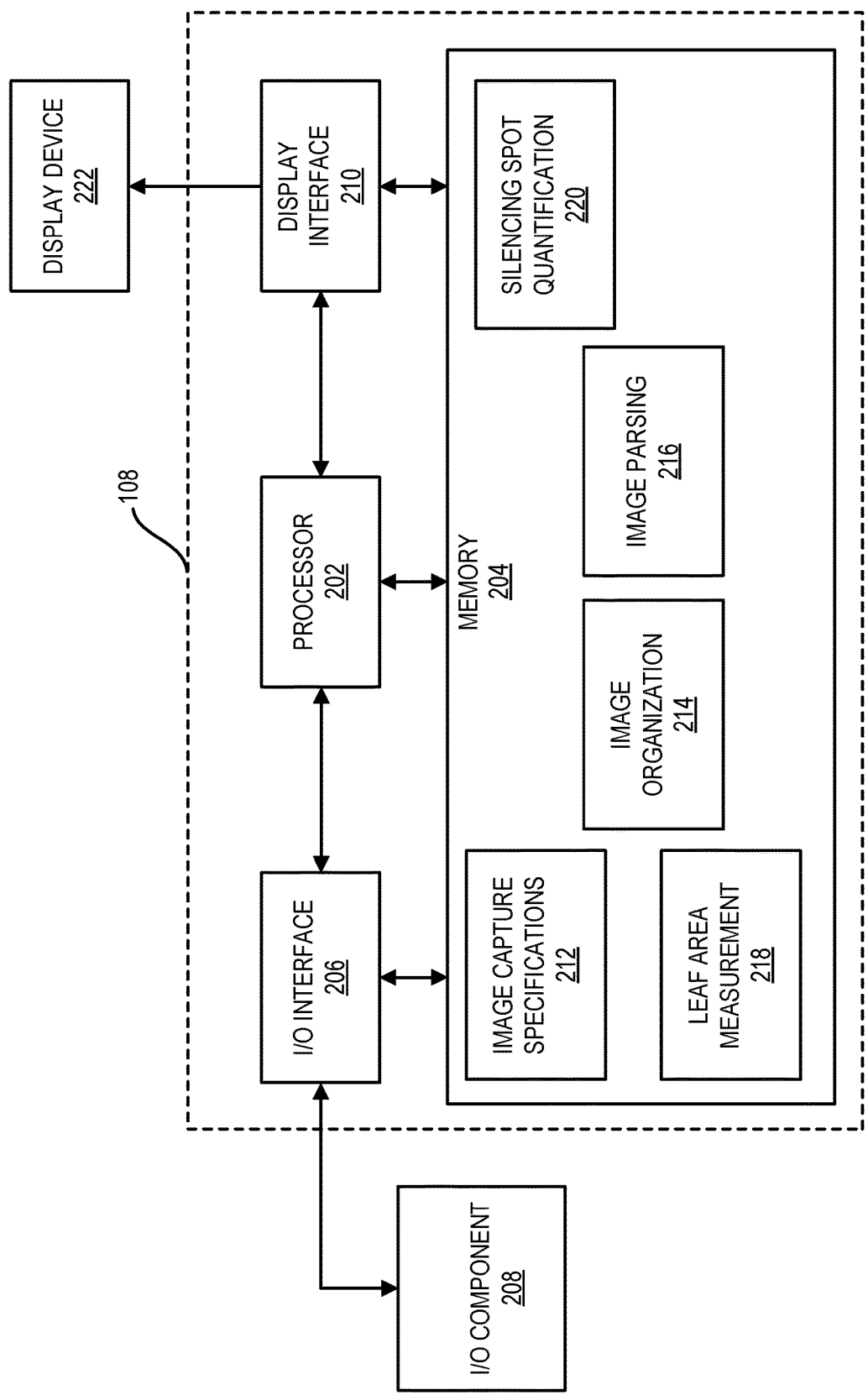
FIG. 2 illustrates an exemplary computing device architecture within which aspects of the disclosure may be implemented according to an embodiment.

FIG. 2 illustrates an exemplary architecture of the computing device 108 (e.g., mobile computing device, tablet computing device, desktop computing device, smartphone, etc.) programmed to provide aspects of the systems and processes described herein via a software environment. In this embodiment, the computing device 108 includes a processor 202, a memory 204, an input/output (I/O) interface 206 that interfaces with an I/O component 208, and display interface 210. The memory 204 includes image capture specifications 212, an image organization script 214, an image parsing script 216, a leaf area measurement script 218, and a silencing spot (or other visible characteristics of interest) quantification script 220 each embodied in processor-executable instructions for executing by processor 202. In this manner, the computing device 108 comprises a special-purpose computing device for capturing images, performing semi-automated quantitative image analysis, and automated batch image processing in accordance with an aspect of the disclosure.

The processor 202, memory 204, I/O interface 206, and display interface 210 are communicatively coupled and/or electrically coupled to each other. The I/O interface 206 is communicatively and/or electrically coupled to the I/O component 208. The processor 202 is adapted to execute processor-executable instructions stored in the memory 204 for capturing images, performing semi-automated quantitative image analysis, and performing automated batch image processing. The I/O interface 206 of FIG. 2 provides a physical data connection between the computing device 108 and I/O component 208. In an embodiment, I/O interface 206 is a network interface card (NIC) or modem and I/O component 208 is a telecommunications connection as further described herein. The display interface 210 provides a physical data connection between computing device 108 and a display device 222. In an embodiment, display device 222 is a touchscreen of a smartphone, tablet computing device, or the like. Additionally or alternatively, display device 222 may be a computer monitor.

Image Capture Procedure

Figure 3:
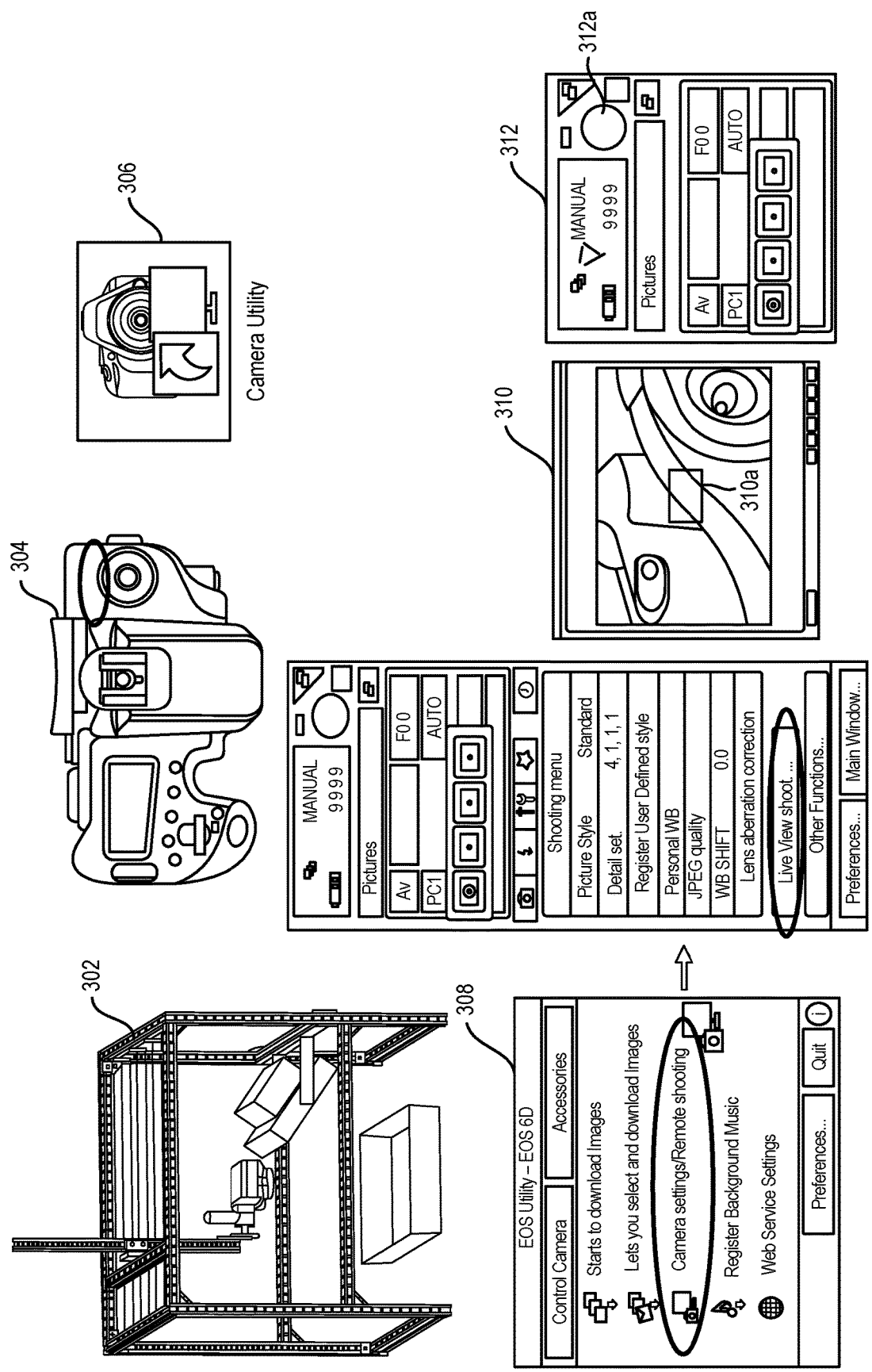
FIG. 3 illustrates an exemplary image capture guide in accordance with an embodiment.

FIG. 3 illustrates an exemplary plant phenotyping image capture guide. At 302, electrical power is supplied to the light sources 104, which may emit either blue or white light. At 304, the imaging device 106 is powered on. In an embodiment in which the imaging device 106 is a digital SLR camera, it may be powered on by selecting a round switch on the right front of the camera. At 306, an operator logs into the computing device 108 and opens a camera utility application. At 308, the operator places the imaging device 106 into a live view shooting mode by selecting "Camera settings/remote shooting" and then "live view shoot". The operator focuses the imaging device 106 by dragging a box 310a displayed on the computing device 108 over the organism under evaluation at 310 and double-clicking to focus the imaging device 106 on that organism. The operator then selects a shutter button 312a on the computing device 108 to capture an image via the imaging device 106.

In an embodiment in which light source 104-A illuminates the organism under evaluation with blue light (e.g., fluorescent, GFP), the following specifications are utilized:
  Tiffen Yellow #12 and Green #11 filters installed
  Camera aspect ratio: 3:2
  Camera ISO: 800
  Camera shutter speed: 6 seconds (") (adjusted as needed for adequate exposure)
  Lens aperture: f/19 (e.g., small lens aperture ensures the entire z-plane of the object is in focus)
  Save images as highest quality JPEG (e.g., without RAW file)

In an embodiment, the exposure (e.g., shutter speed) settings and white balance (e.g., 3500 Kelvins) are fixed among a plurality of acquired images, enabling quantitative comparison across the images using image thresholding based on brightness and/or color, as further described herein.

Figure 4A:
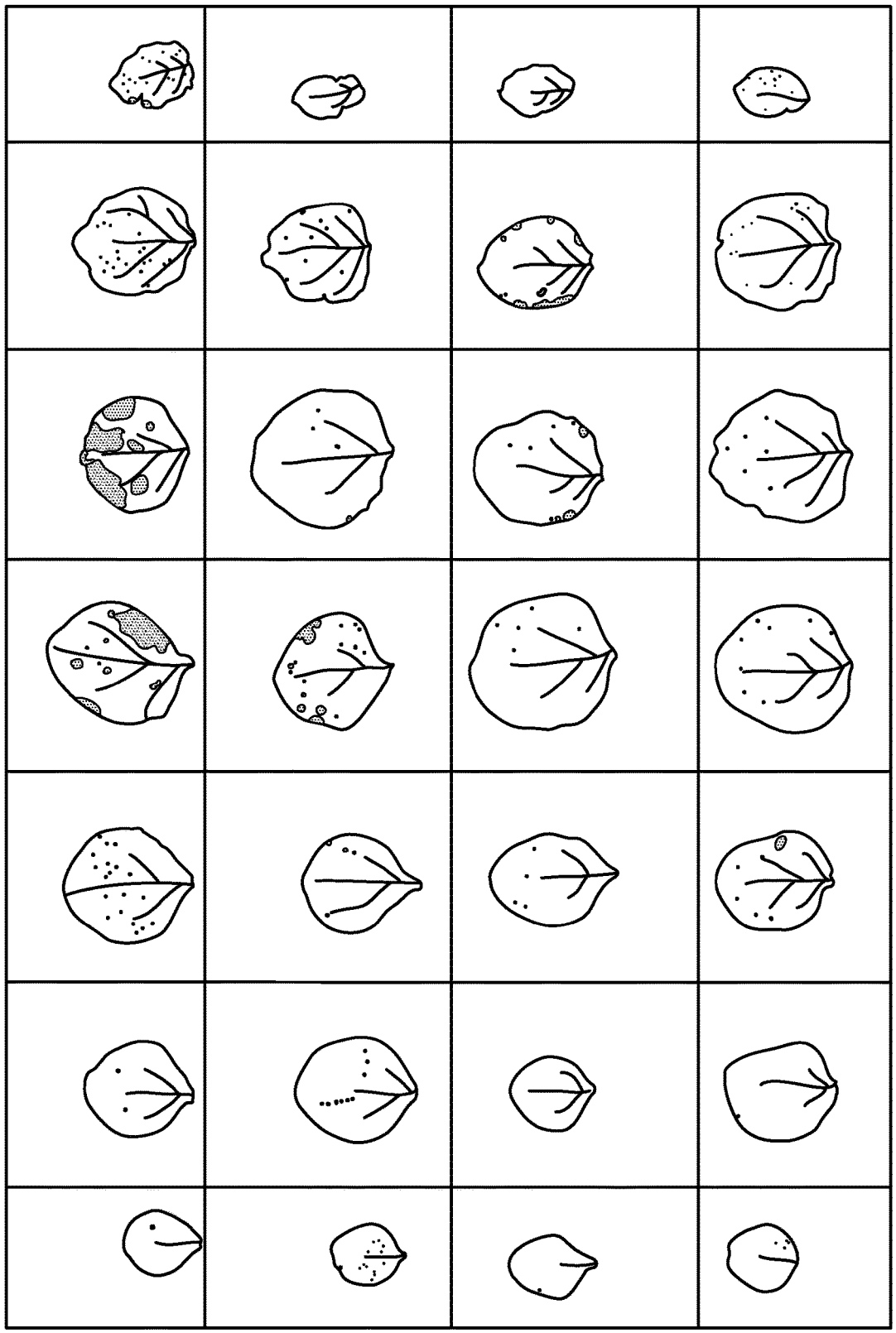
FIGS. 4A and 4B illustrate exemplary images captured in accordance with an embodiment.

FIG. 4A illustrates an exemplary image captured by imaging device 106 having the above specifications while a plant leaf is illuminated by light source 104-A emitting blue light.

In an embodiment in which light sources 104-B illuminate the organism under evaluation with white light, the following specifications are utilized:
  Tiffen Yellow #12 and Green #11 filters removed
  Camera aspect ratio: 3:2
  Camera ISO: 800
  Camera shutter speed: ⅟$_{15}$ seconds (") (adjusted as needed for adequate exposure)
  Lens aperture: f/19 (e.g., small lens aperture ensures the entire z-plane of the object is in focus)
  Save images as highest quality JPEG (e.g., without RAW file)

In an embodiment, the exposure (e.g., shutter speed) settings and white balance (e.g., 3500 Kelvins) are fixed among a plurality of acquired images, enabling quantitative comparison across the images using image thresholding based on brightness and/or color, as further described herein.

Figure 4B:
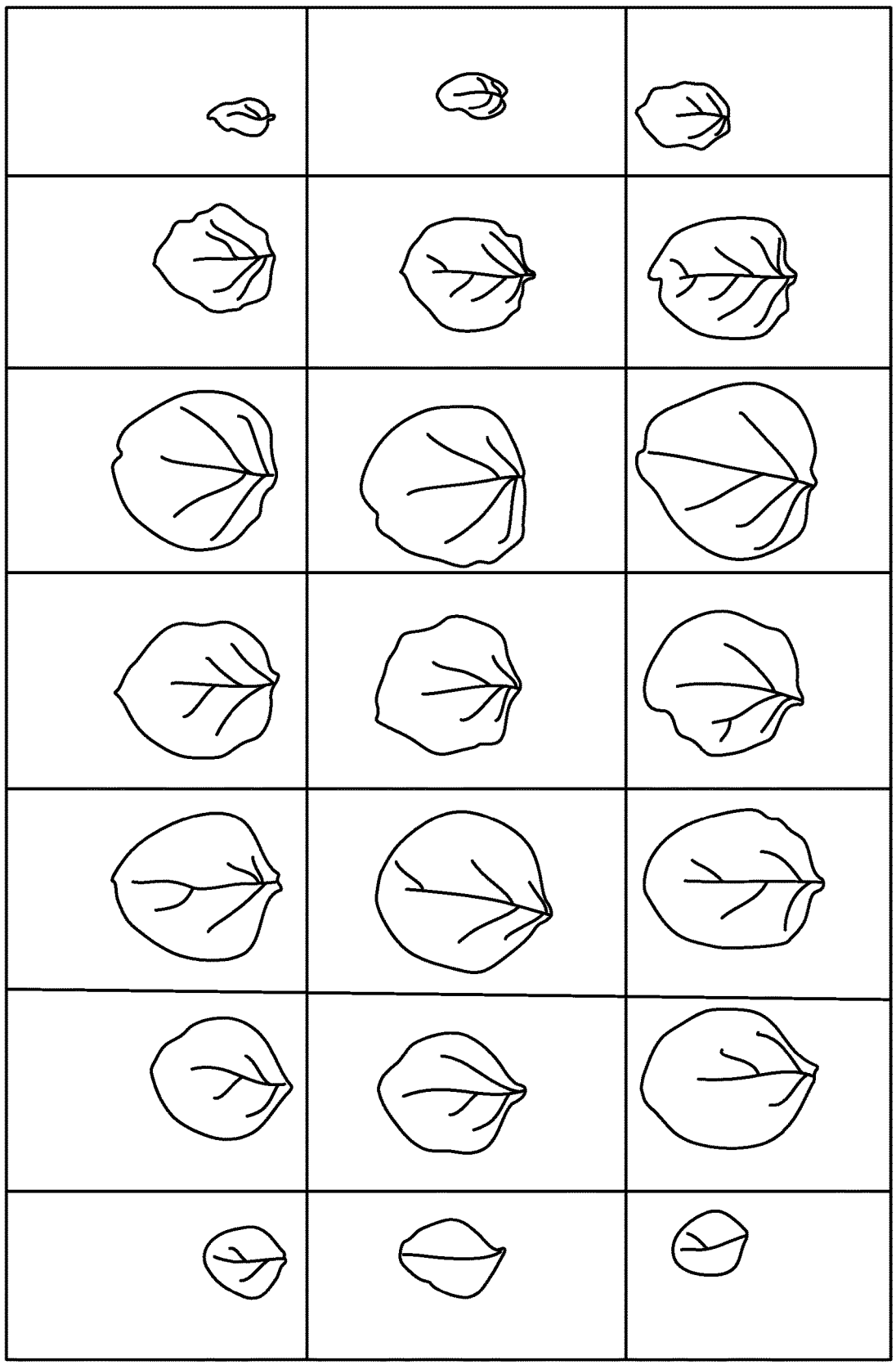

FIG. 4B illustrates an exemplary image captured by imaging device 106 having the above specifications while a plant leaf is illuminated by light sources 104-B emitting white light.

The image capture specifications described above enable consistent image quality, which enables quantitative comparison of data across images and across experiments performed at different times. The imaging device, having been mounted to the frame assembly, is not moved during capture of separate images that are to be quantitatively compared. This immobility allows true quantitative comparison because the number of pixels (e.g., the basic unit of quantification) corresponding to a region of interest is identical between regions of interest of identical size in separate images. In an embodiment, the image capture specifications described above comprise the image capture specifications 212 embodied as processor-readable instructions stored on the memory 204 of computing device 108.

Image Analysis

Figure 5:
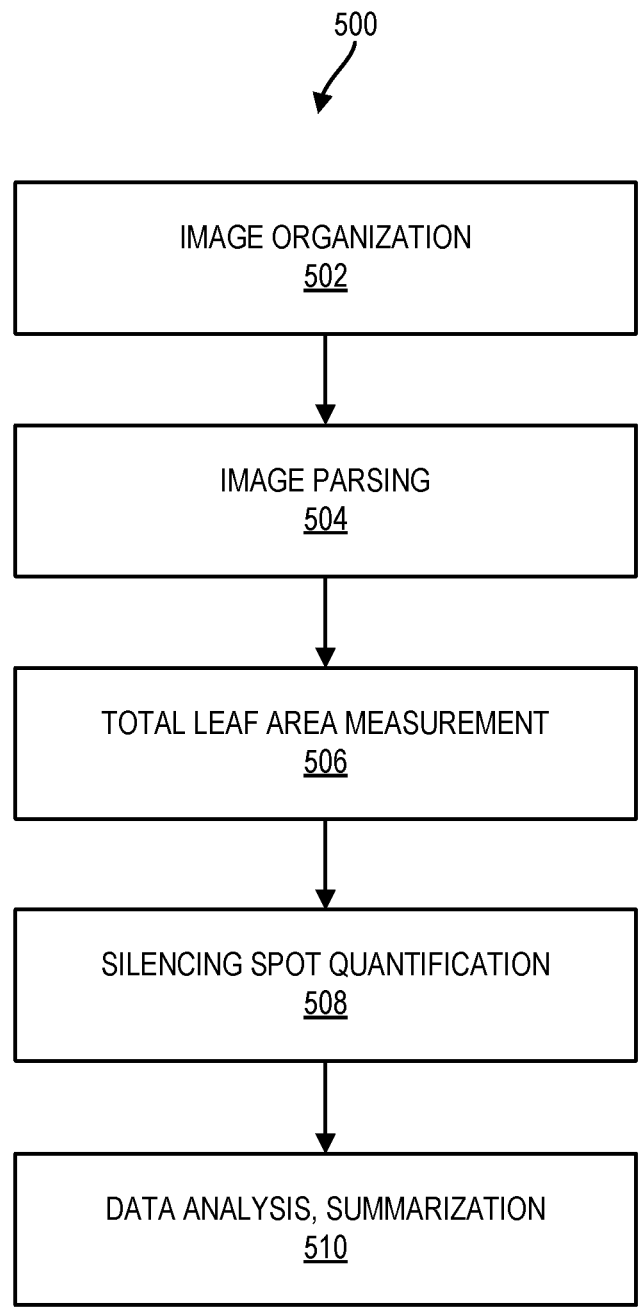
FIG. 5 is a block diagram of an exemplary quantitative image analysis process in accordance with an embodiment.

FIG. 5 illustrates a quantitative image analysis process, generally indicated at 500, in accordance with an aspect of the disclosure. The process 500 includes image organization 502, image parsing 504, total leaf area measurement 506, silencing spot quantification 508, and data analysis and summarization 510. The quantitative image analysis process 500 described herein enables quantitative readouts of multiple visible phenotypes from experiments conducted on multiple plant species and has been reduced to practice for other diverse applications, such as identifying presence, number, and quantity of pathogen infections on bacterial plates, plant tissue, and vegetables, for example. In an embodiment, aspects of image organization 502, image parsing 504, total leaf area measurement 506, silencing spot quantification 508, and data analysis and summarization 510 are automated via execution of scripts on computing device 108 as further described herein to enable scaling the techniques described herein to analyze up to thousands of images at a time.

Barcodes for Mass Image Organization

Figure 6A:
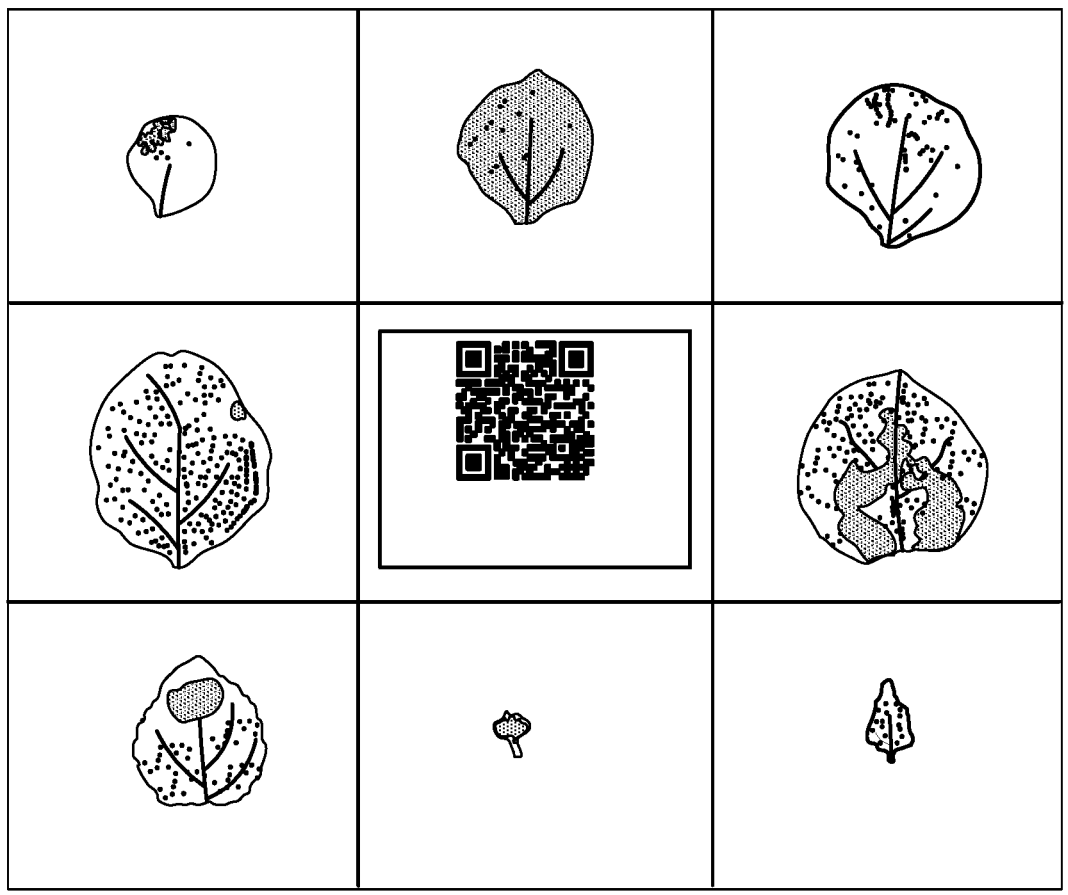
FIGS. 6A and 6B illustrate aspects of an exemplary image organization process in accordance with an embodiment.
Figure 6B:
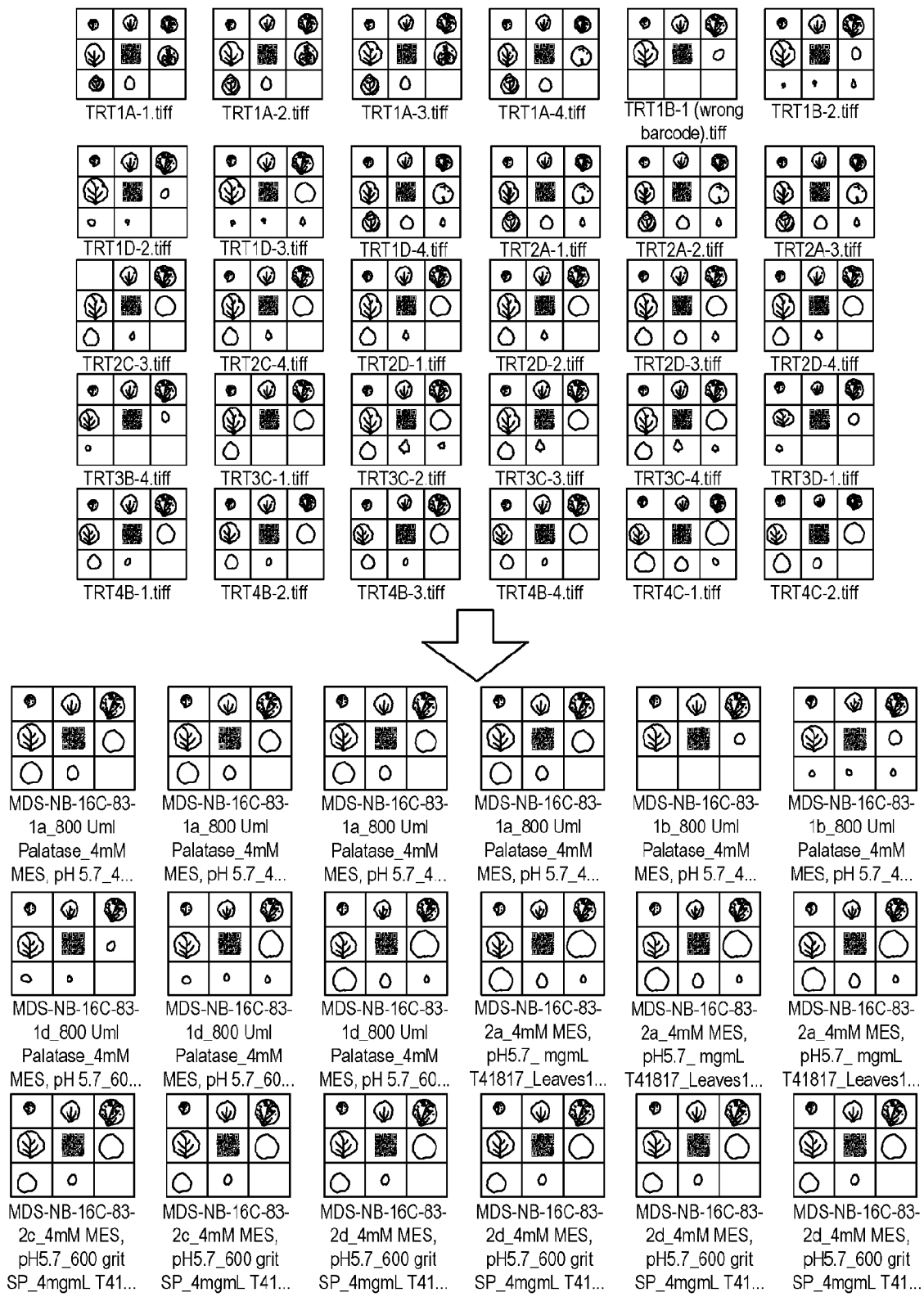

In an embodiment, image organization 502 includes automated image annotation using barcodes (e.g., two-dimensional (2-D) quick-response (QR) codes) placed in an image. For example, the 2-D QR format barcode illustrated in FIG. 6A may contain metadata describing a treatment that is decodable by one or more applications (e.g., FIJI QR Decoder plug-in) executing on computing device 108. In an embodiment, computing device 108 executes processor-executable instructions comprising a barcode-decoding, file-renaming script (e.g., ImageJ). In an embodiment, the script comprises the image organization script 214 embodied as processor-readable instructions stored on the memory 204 of computing device 108. Upon execution of the script, computing device 108 changes the image titles (e.g., filenames) from the original values to a value decoded from the QR barcode in the image, as illustrated by FIG. 6B. An exemplary FIJI (ImageJ) 2D barcode-decoding, file-renaming macro script is provided below:

```
myFileName=getTitle( )
tempName=myFileName
selectWindow(tempName);
run("Duplicate . . . ", tempName+"-1");
run("8-bit");
setAutoThreshold("Default");
run("Threshold . . . ");
setThreshold(0, 143);
setOption("BlackBackground", false);
run("Convert to Mask");
run("QR Decoder", "error=FILE_RENAME_FAILED");
selectWindow("QR Code");
result=getInfo("window.contents");
while(startsWith(result," ")){result=substring(result,1)};
while(endsWith(result," ")){result=substring(result,0, lengthOf(result)-1)};
result=substring(result,0, lengthOf(result)-1);
tempName2="C:\\Users\\awmrocz\\Desktop\\Output Folder\\"+result+"_"+tempName;
print(tempName2);
selectWindow(tempName);
saveAs("TIFF", tempName2);
list=getList("window.titles");
    for (i=0; i<list.length; i++){
    winame=list[i];
    selectWindow(winame);
    run("Close");}
```

In an embodiment, the quantitative data output by an image analysis application in accordance with an aspect of the disclosure (e.g., FIJI) is formatted by default such that the image titles are displayed alongside the quantitative data associated with the subject image. This concurrent display enables, with the use of delimiting characters in the QR code, the metadata decoded from the image in the file-renaming process to be parsed into separate components. Each of the separate components describes an individual aspect of the treatment. The metadata is also entered into a data analysis and visualization software template in a standardized format, which allows the data analysis and visualization software template to completely automate analysis and visual display of the subject data.

Batch Image Parsing

Figure 7:
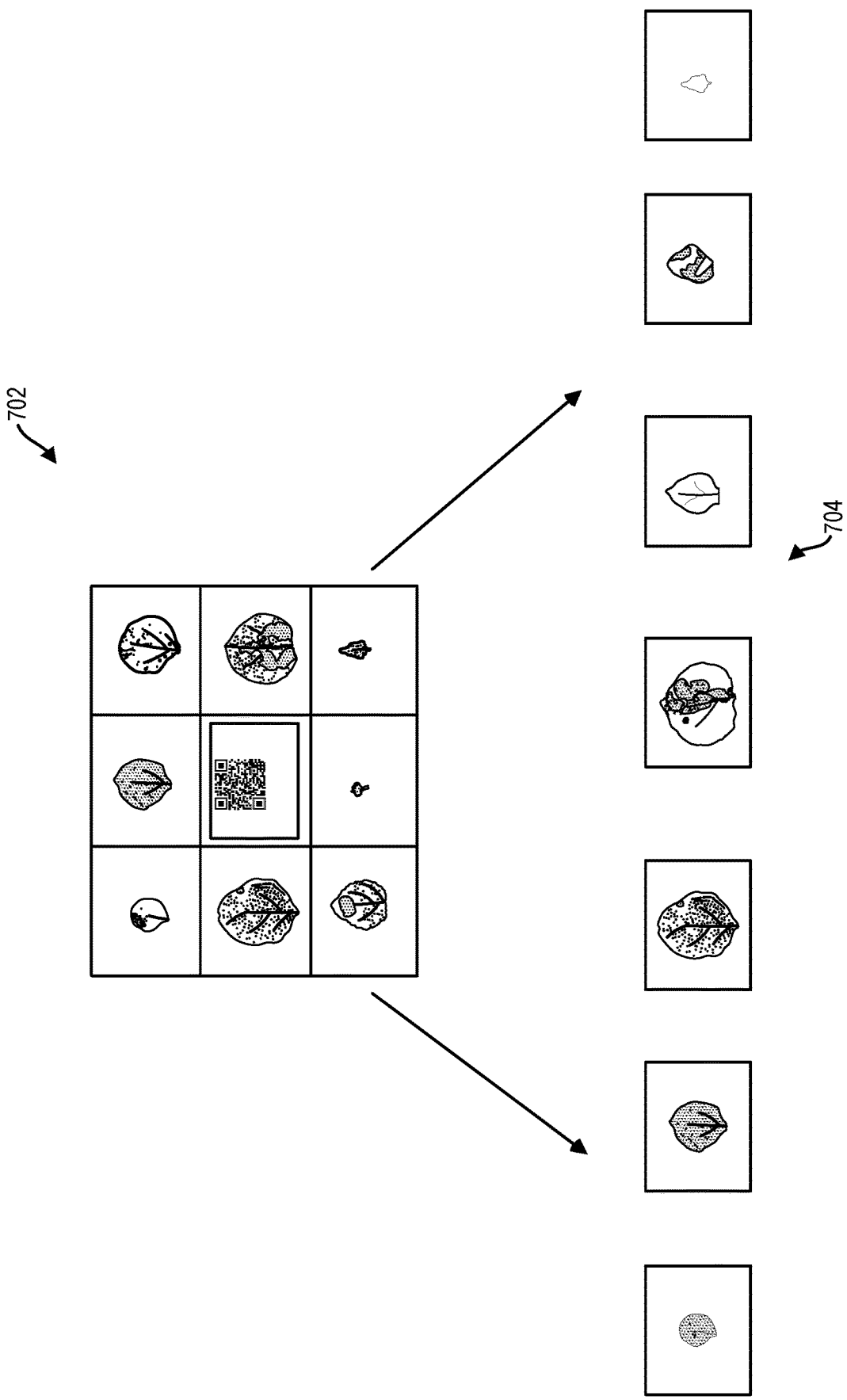
FIG. 7 illustrates aspects of an exemplary image parsing process in accordance with an embodiment.

In an embodiment, image parsing 504 includes automated parsing of images for analysis of individual organisms captured in one image. As illustrated in FIG. 7, a plurality of organisms may be captured in one image 702 by imaging device 106 to increase imaging efficiency. The spot quantification techniques described herein may have better results when performed on images of individual organisms. For example, collecting and analyzing quantitative data on individual plants, individual leaves on plants, or by leaf position on a plant, rather than a group of plants in the aggregate, yields information on differences in treatment effects based on plant tissue age. This information makes possible calculations of variability in response to treatment between individual plants (e.g., standard error) necessary for statistical analysis of the subject data. The computing device 108 executes processor-executable instructions to parse the group image 702 and separate the individual organisms therein into individual images 704. For example, the individual organisms may be separated into a specified, but adaptable, number of equally sized rows and columns indicated in the image parsing script and enabled by physical markings on the imaging template denoting the required position of the individual organisms on the imaging template during the process of image capture for correct image parsing. In an embodiment, the script comprises the image parsing script 216 embodied as processor-readable instructions stored on the memory 204 of computing device 108.

An exemplary FIJI (ImageJ) image parsing macro script is provided below:

```
myFileName=getTitle( )
tempName=myFileName;
selectWindow(tempName);
while(startsWith(tempName," ")){tempName=substring
    (tempName,1)};
while(endsWith(tempName," ")){tempName=substring
    (tempName,0, lengthOf(tempName)-5)};
tempNametrim=substring(tempName,0, lengthOf(temp-
    Name)-5);
run("Montage to Stack . . . ", "images_per_row=3 imag-
    es_per_column=3 border=50");
run("Stack to Images");
selectWindow("Stack-0009");
saveAs("Tiff", "C: \\Users\\awmrocz\\Desktop\\OF\\"+
    tempNametrim+"_Leaf9");
close( )
selectWindow("Stack-0008");
saveAs("Tiff", "C: \\Users\\awmrocz\\Desktop\\OF\\"+
    tempNametrim+"_Leaf8");
close( )
selectWindow("Stack-0007");
saveAs("Tiff", "C: \\Users\\awmrocz\\Desktop\\OF\\"+
    tempNametrim+"_Leaf7");
close( )
selectWindow("Stack-0006");
saveAs("Tiff", "C: \\Users\\awmrocz\\Desktop\\OF\\"+
    tempNametrim+"_Leaf6");
close( )
selectWindow("Stack-0005");
close( )
selectWindow("Stack-0004");
saveAs("Tiff", "C: \\Users\\awmrocz\\Desktop\\OF\\"+
    tempNametrim+"_Leaf4");
close( )
selectWindow("Stack-0003");
saveAs("Tiff", "C: \\Users\\awmrocz\\Desktop\\OF\\"+
    tempNametrim+"_Leaf3");
close( )
selectWindow("Stack-0002");
saveAs("Tiff", "C: \\Users\\awmrocz\\Desktop\\OF\\"+
    tempNametrim+"_Leaf2");
close( )
selectWindow("Stack-0001");
saveAs("Tiff", "C: \\Users\\awmrocz\\Desktop\\OF\\"+
    tempNametrim+"_Leaf1");
close( )
```

Leaf Area Measurement

Figure 8A:
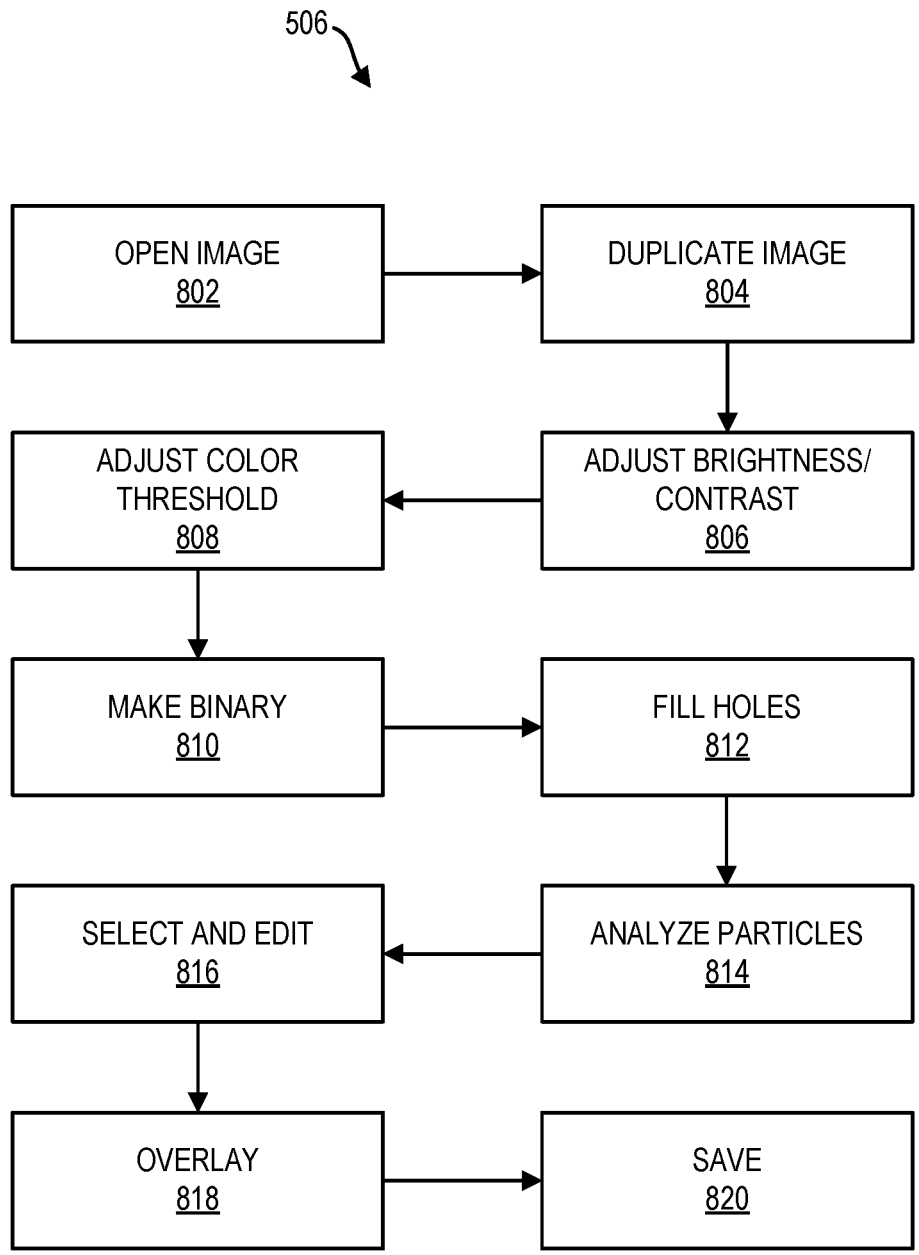
FIG. 8A is a block diagram of an exemplary area measurement process in accordance with an embodiment.

FIG. 8A illustrates an exemplary embodiment of total leaf area measurement 506. At 802, an operator of the computing device 108 opens an original image. The operator duplicates the image at 804 by creating a copy of the opened image. The operator adjusts brightness and contrast of the copied image at 806 and adjusts a color threshold of the copied image at 808. Exemplary adjustments include leaving Hue and Saturation thresholds at 0 minimum and 255 maximum, setting the brightness threshold to about 100 minimum and the upper threshold to about 255 maximum or until the organism is completely outlined, red threshold color, and a dark background. At 810, the operator instructs the computing device 108 to make the copied image binary (e.g., black or white pixels only with no 8-bit grayscale pixel information) and the operator fills in holes (e.g., any spots in the organism area missed by threshold adjustment, any gaps in the threshold selection contained within the perimeter of the selection, etc.) at 812. At 814, the computing device 108 analyzes the particles. Exemplary settings for particle analysis include—Size: 500-infinity (can be adjusted as needed to select organism while minimizing selection of background area), Circularity: 0.00-1.00, Show: Outlines (e.g., displays the region of interest selected and measured from the image for the overlay process described herein), and checking a "Display Results" option. In an embodiment, checking the "Display Results" option results in displaying the quantitative data in a "Results" window that is saved by the script for subsequent analysis. At 816, the operator performs a select and edit operation. In an embodiment, the operator selects all of the overlay of the region of interest selected and measured from the image, creates selections, edits selection properties, and adds the selection to a manager. Exemplary selection property edits include—Stroke color: #0033ff and Width: 1, which provides visual contrast between the selection and the original image over which it is subsequently overlaid. For example, the visual contrast enables a quick visual check of the accuracy of selecting and quantitatively analyzing the intended region of interest in the image. The operator then selects the original image opened at 802 and generates an image overlay from the ROI manager at 818. In an embodiment, the overlay is flattened. The operator then saves the overlay image at 820.

Figure 8B:
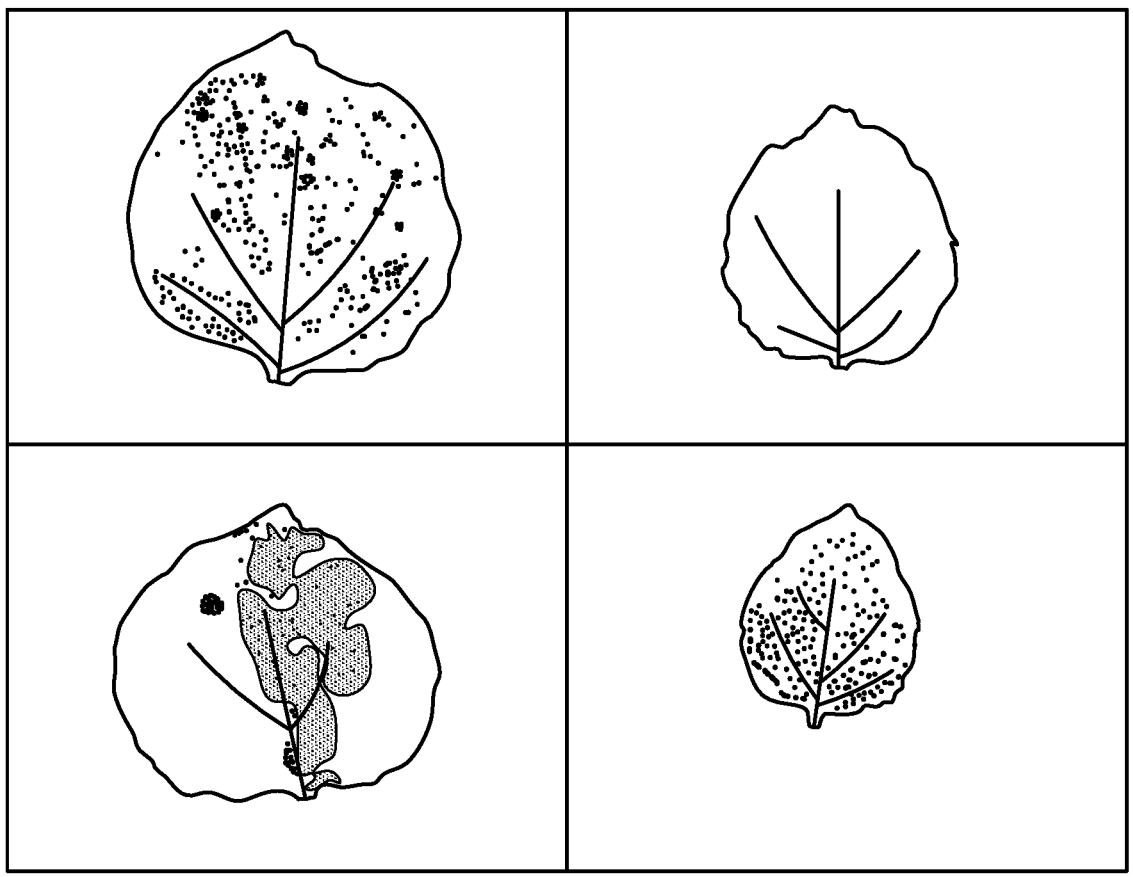
FIG. 8B is an exemplary output of the area measurement process of FIG. 8A.

Alternatively, the computing device 108 executes processor-executable instructions to perform total leaf area measurement 506. Preferably, total leaf area measurement 506 is completely automated (i.e., no user input is required other than to begin execution of the script). In an embodiment, the instructions (e.g., script) comprises the leaf area measurement script 218 embodied as processor-readable instructions stored on the memory 204 of computing device 108. FIG. 8B illustrates an exemplary leaf area measurement visual output (e.g., on display device 222) according to an embodiment. An exemplary FIJI Leaf Area Measurement Automated Workflow, Macro Batching Script is provided below:

```
myFileName=getTitle( )
tempName=myFileName;
selectWindow(tempName);
while(startsWith(tempName," ")){tempName=substring
    (tempName,1)};
while(endsWith(tempName," ")){tempName=substring
    (tempName,0, lengthOf(tempName)-4)};
tempNametrim=substring(tempName,0, lengthOf(temp-
    Name)-4);
run("Brightness/Contrast . . . ");
run("Enhance Contrast", "saturated=0.35");
run("Duplicate . . . ", " ");
selectWindow(tempNametrim+"-1.tif");
run("Color Threshold . . . ");
min=newArray(3);
max=newArray(3);
filter=newArray(3);
a=getTitle( );
run("HSB Stack");
run("Convert Stack to Images");
selectWindow("Hue");
rename("0");
selectWindow("Saturation");
rename("1");
selectWindow("Brightness");
rename("2");
min[0]=0;
max[0]=255;
filter[0]="pass";
min[1]=0;
max[1]=255;
```

```
filter[1]="pass";
min[2]=127;
max[2]=255;
filter[2]="pass";
for (i=0;i<3;i++){
    selectWindow(" "+i);
    setThreshold(min[i], max[i]);
    run("Convert to Mask");
    if (filter[i]=="stop") run("Invert");
}
imageCalculator("AND create", "0","1");
imageCalculator("AND create", "Result of 0","2");
for (i=0;i<3;i++){
    selectWindow(" "+i);
    close( )
}
selectWindow("Result of 0");
close( )
selectWindow("Result of Result of 0");
rename(a);
run("Make Binary");
run("Fill Holes");
run("Analyze Particles . . . ", "size=1000-Infinity
    show=Outlines display");
selectWindow("Drawing of"+tempNametrim+"–1.tif");
run("Make Binary");
run("Create Selection");
run("Properties . . . ", "stroke=#0033ff width=1");
roiManager("Add");
selectWindow(tempName);
run("From ROI Manager");
run("Flatten");
saveAs("Tiff", tempNametrim+"_Leaf Area Overlay");
selectWindow("Drawing of"+tempNametrim+"–1.tif");
close( )
selectWindow("Results");
saveAs("Results", "C:\\Users\\awmrocz\\Desktop\\OF\\
    LeafAreaQuantification.xsl");
roiManager("Select", 0);
roiManager("Deselect");
roiManager("Delete");
selectWindow(tempNametrim+"–1.tif");
close( )
```

Silencing Spot Quantification

Figure 9A:
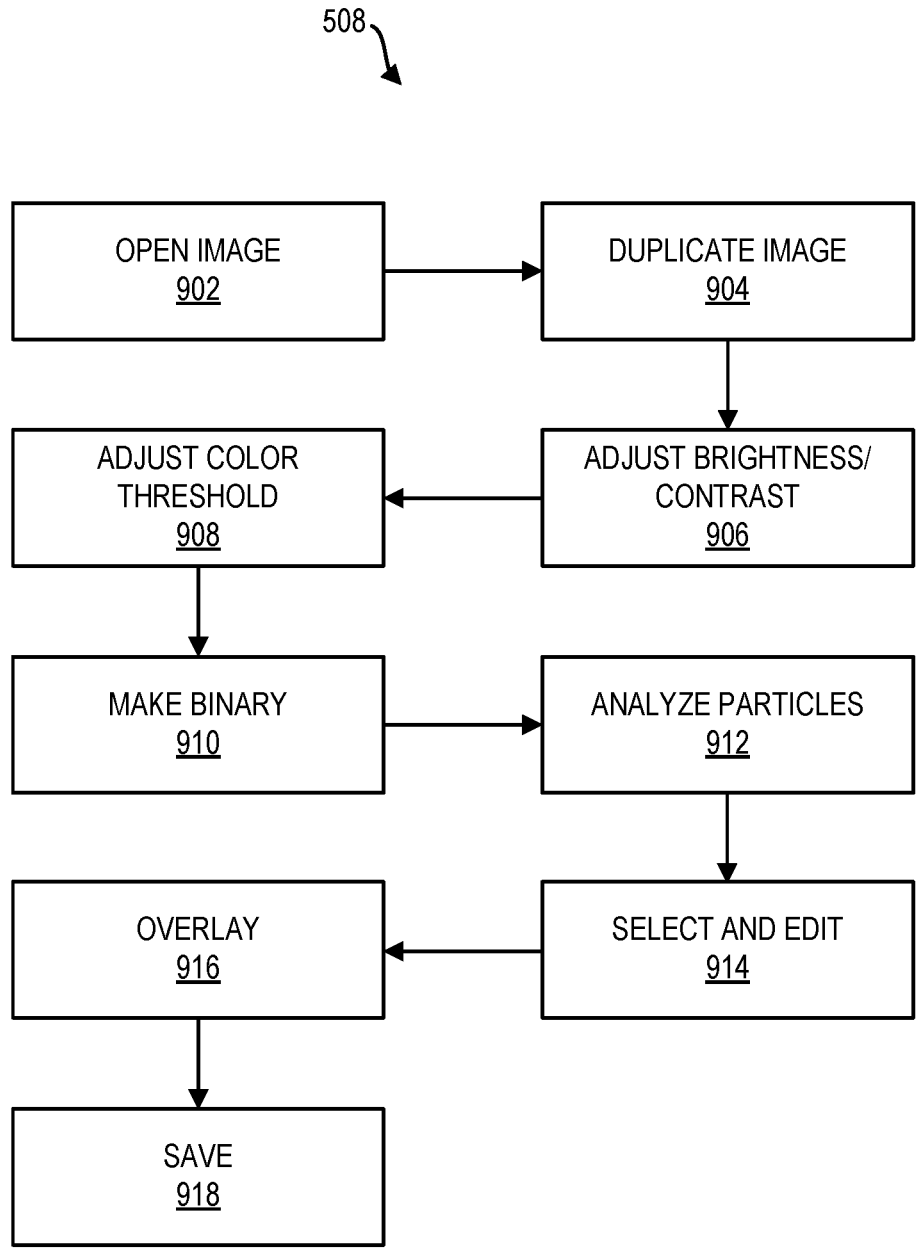
FIG. 9A is a block diagram of an exemplary silencing spot quantification process in accordance with an embodiment.
Figure 9B:
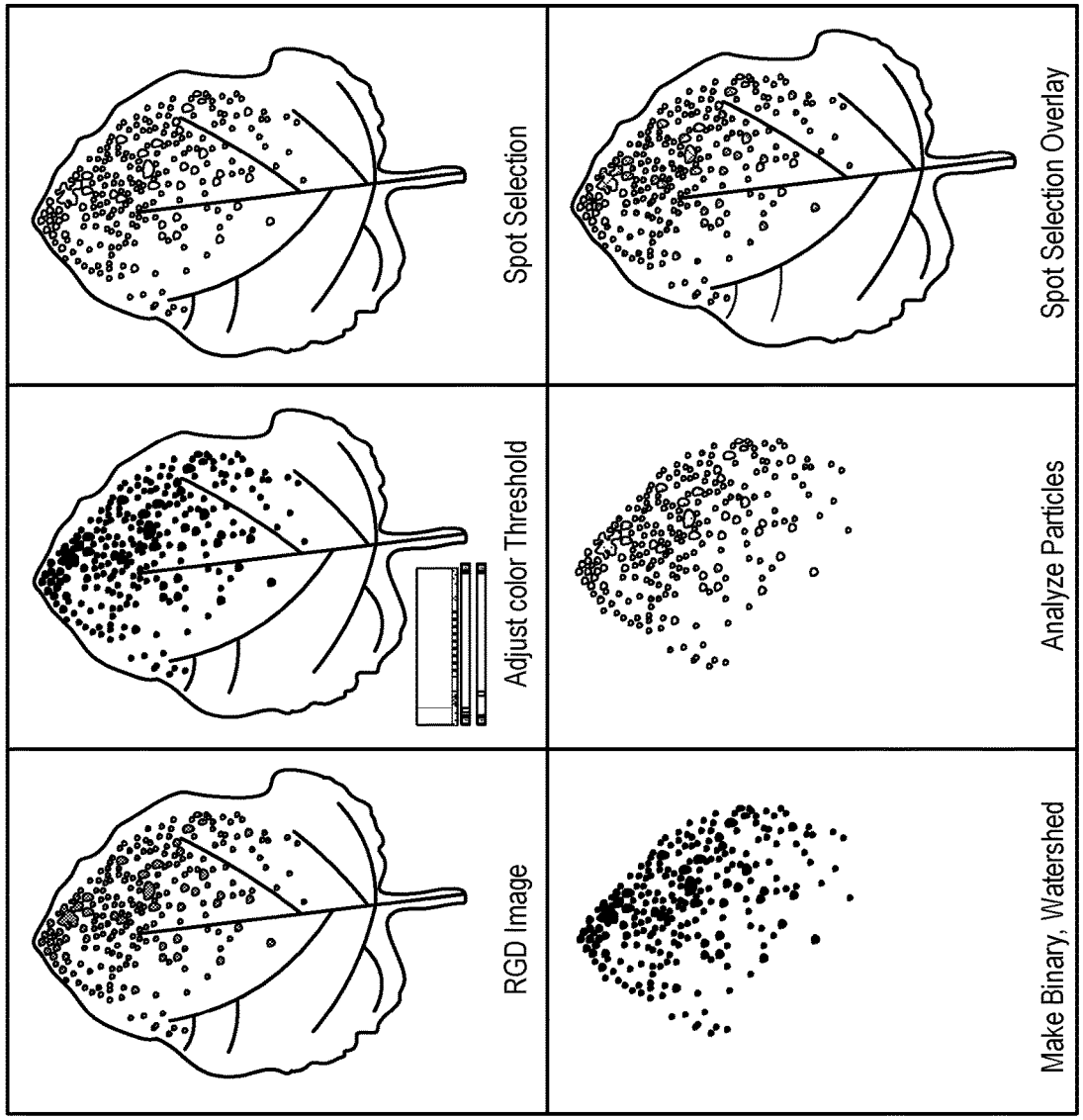
FIGS. 9B and 9C illustrate exemplary outputs of the silencing spot quantification process of FIG. 9A.

FIGS. 9A and 9B illustrate an exemplary embodiment of silencing spot quantification 508. At 902, an operator of the computing device 108 opens an original image (e.g., "RGB Image" in FIG. 9B). The operator duplicates the image at 904 by creating a copy of the opened image. The operator adjusts brightness and contrast of the copied image at 906 and adjusts a color threshold of the copied image at 908 (e.g., "Adjust Color Threshold" in FIG. 9B). Exemplary adjustments include setting the Hue threshold to about 40 minimum (or until spots are selected) (e.g., "Spot Selection" in FIG. 9B) and 255 maximum and setting the brightness threshold to about 100 minimum and 255 maximum. At 910, the operator instructs the computing device 108 to make the copied image binary (e.g., "Make Binary, Watershed" in FIG. 9B). For example, a "Make Binary" selection converts the image to black or white pixels only, selected and unselected, with no 8-bit grayscale pixel information, and a "Watershed" selection effectively prevents selection and quantitative measurement of regions not of interest that are surrounded by regions of interest (e.g., a spot of normal plant leaf tissue contained within the perimeter of a region of plant leaf tissue with visible silencing). At 912, the computing device 108 analyzes the particles (e.g., "Analyze Particles" in FIG. 9B). Exemplary settings for particle analysis include Size: 20-infinity (can be adjusted as needed to select spots while minimizing spurious selection), Circularity: 0.00-1.00, Show: Outlines, and checking a "Display Results" option. At 914, the operator performs a select and edit operation. In an embodiment, the operator selects all of the overlay of the region of interest selected and measured from the image, creates selections, edits selection properties, and adds the selection to a manager. Exemplary selection property edits include Stroke color: #0033ff and Width: 1, which provides visual contrast between the selection and the original image over which it is subsequently overlaid. For example, the visual contrast enables a quick visual check of the accuracy of selecting the intended region of interest in the image. The operator then selects the original image opened at 902 and generates an image overlay from the ROI manager at 916 (e.g., "Spot Selection Overlay" in FIG. 9B). In an embodiment, the overlay is flattened. The operator then saves the overlay image at 918. The images resulting from this process with the overlay displaying the region selected and quantitatively measured, produced for each image processed in a batch, enable rapid, visual checks of the accuracy of selecting and quantitatively analyzing the intended region of interest in the image.

Figure 9C:
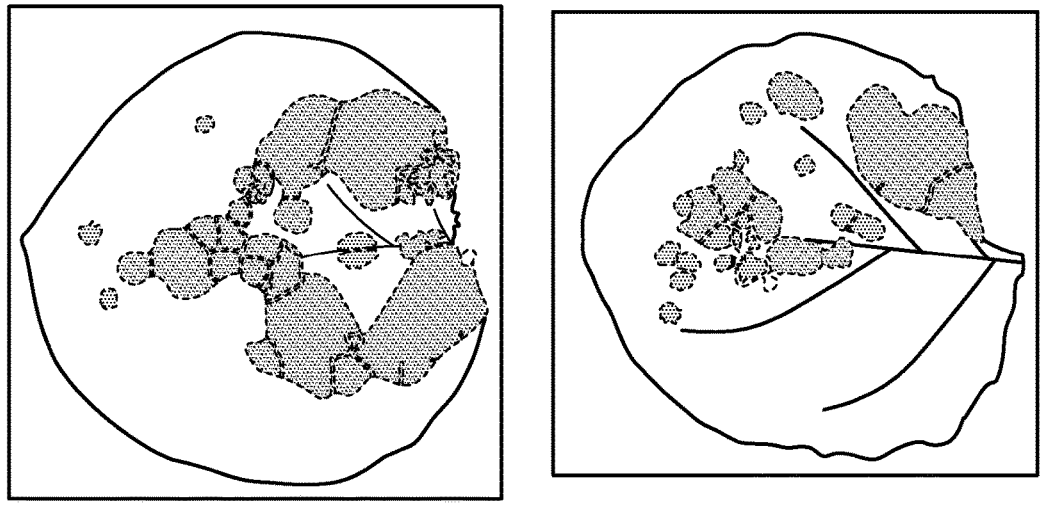
Figure 9C:
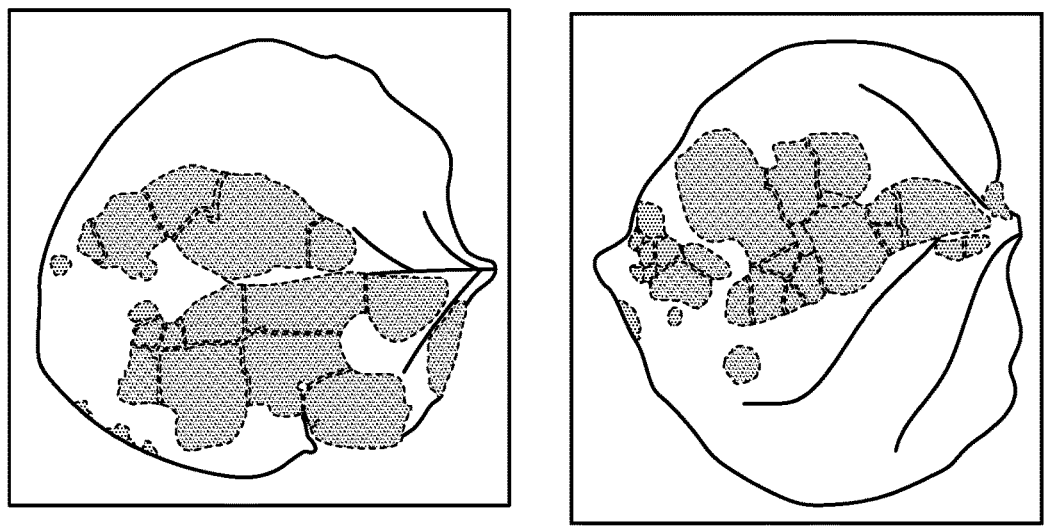
Figure 10:
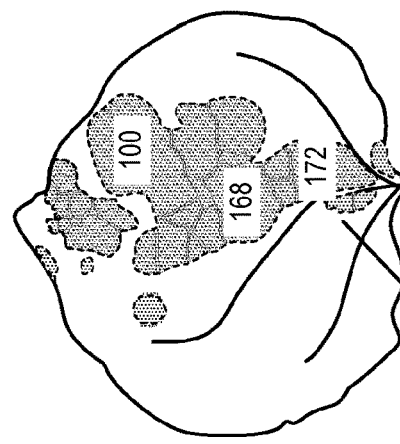
FIG. 10 illustrates an exemplary identification number matching process in accordance with an embodiment.

Alternatively, the computing device 108 executes processor-executable instructions to perform silencing spot quantification 508. In one embodiment, the instructions (e.g., script) provide a semi-automated quantitative measurement of the region of interest by pausing for user input of threshold settings used to specify the region of interest for quantitative measurement for each image processed and automating the remainder of the process upon user action for each image processed. In an embodiment, the script comprises the silencing spot quantification script 220 embodied as processor-readable instructions stored on the memory 204 of computing device 108. FIG. 9C illustrates an exemplary GFP silencing spot quantification visual output (e.g., on display device 222) according to an embodiment. The exemplary GFP silencing spot quantification visual output may also include a unique spot ID number in the spot (FIG. 10). In an embodiment, silencing spot quantification is referred to as a phenotype of interest measurement. An exemplary FIJI Silencing Spot Quantification Automated Workflow, Macro Batching Script is provided below:

```
myFileName=getTitle( )
setBatchMode(false);
myFileName=getTitle( )
tempName=myFileName;
selectWindow(tempName);
while(startsWith(tempName," ")){tempName=substring
    (tempName,1)};
while(endsWith(tempName," ")){tempName=substring
    (tempName,0,
    lengthOf(tempName)–4)};
tempNametrim=substring(tempName,0, lengthOf(temp-
    Name)–4);
selectWindow(tempName);
run("Duplicate . . . "," ");
selectWindow(tempNametrim+"–1.tif");
run("Brightness/Contrast . . . ");
run("Enhance Contrast", "saturated=0.35");
run("Color Threshold . . . ");
waitForUser("Set Threshold, click Select and then Fil-
    tered, click OK");
run("Make Binary");
run("Fill Holes");
run("Watershed");
```

```
run("Analyze Particles . . . ", "size=20-Infinity
    show=Outlines display");
selectWindow("Results");
saveAs("Results", "C:\\Users\\awmrocz\\Desktop\\OF\\
    SpotQuantification.xsl");
selectWindow("Drawing of"+tempNametrim+"-1.tif");
run("Make Binary");
run("Create Selection");
run("Properties . . . ", "stroke=#0033ff width=1");
roiManager("Add");
selectWindow("Drawing of"+tempNametrim+"-1.tif");
close( )
selectWindow(tempNametrim+"-1.tif");
close( )
selectWindow(tempName);
run("From ROI Manager");
selectWindow(tempName);
run("Flatten");
saveAs("Tiff", tempNametrim+"_Spot Selection Over-
    lay");
roiManager("Select", 0);
roiManager("Deselect");
roiManager("Delete");
```

Figure 11:
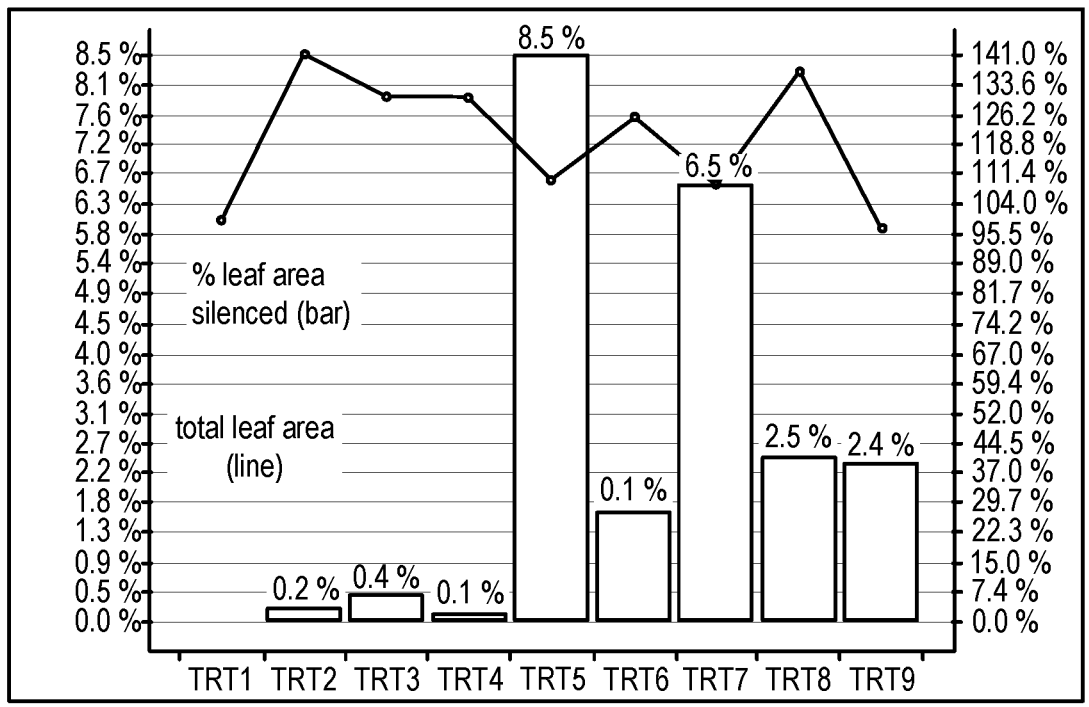
FIGS. 11 and 12 illustrate exemplary outputs of metrics calculated from the quantitative analysis in accordance with an embodiment.
Figure 11:
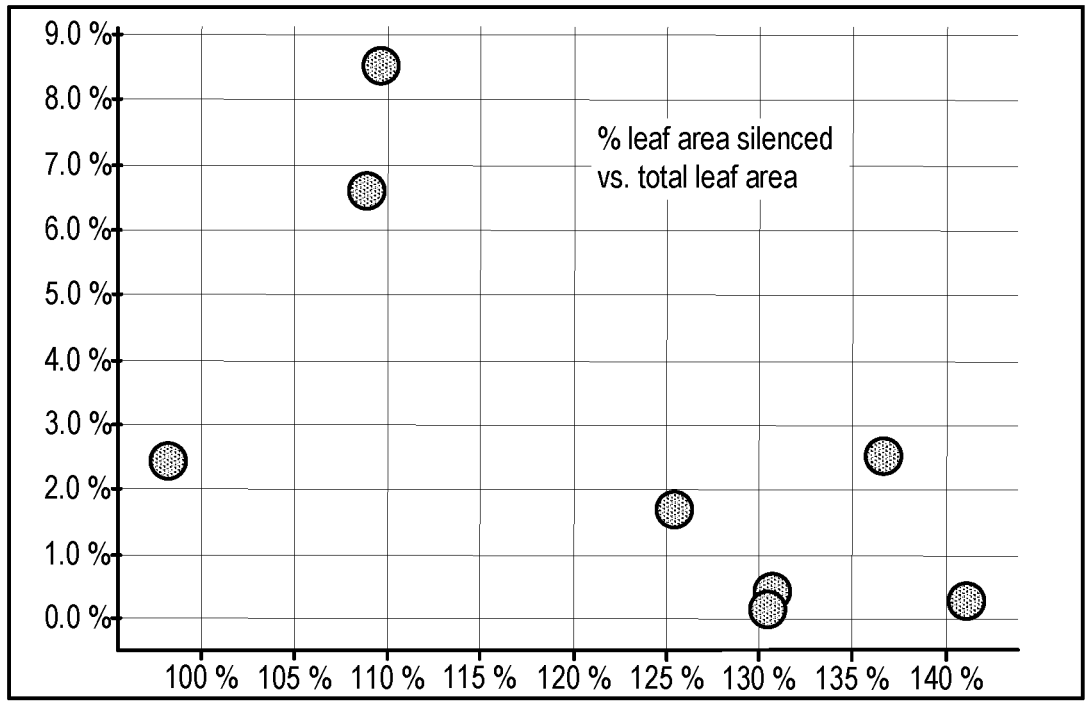
Figure 12:
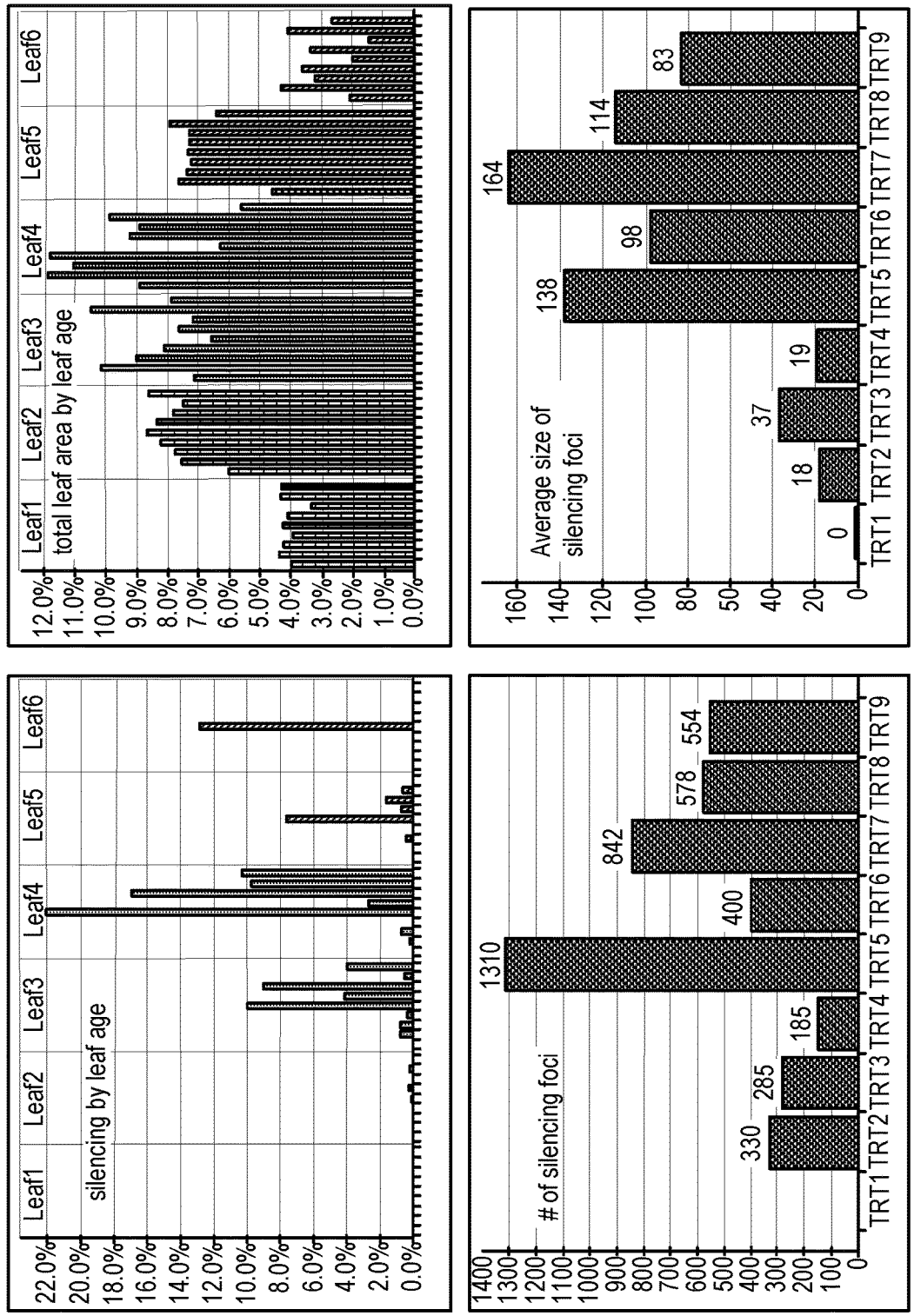

In an embodiment, image analysis techniques described herein output numerical data including a table with image title, unique spot ID number, and spot area. As illustrated in FIG. 10, the unique spot ID number in the table matches the spot number on the visual overlay, enabling manual corrections to any region spuriously selected and quantitatively analyzed. As illustrated by FIGS. 11 and 12, various metrics can be calculated from this data (e.g., utilizing Excel, Spotfire, JMP, etc.). Exemplary metrics include, but are not limited to, total leaf area (e.g., for individual leaves, by plant, and/or by treatment), percent leaf area showing target gene silencing phenotype (e.g., for individual leaves, by plant, and/or by treatment), penetrance of silencing phenotype (e.g., percent of all leaves across all reps from a given treatment with phenotype), correlation between percent leaf area silenced and total leaf area, and number of and average size of regions of interest (e.g., visible gene silencing). In an embodiment, the use of delimiting characters in the QR code included in the captured images enables the metadata decoded from the image by the file-renaming process described herein to be parsed into separate components. Each component describes a categorical or quantitative individual aspect of the treatment. Furthermore, each component is entered into a data analysis and visualization software template (e.g., Microsoft Excel, Tibco Spotfire, etc.) in a standardized format, which enables the data analysis and visualization software template to completely automate analysis and visual display of the multiple metrics exemplified above from the subject data. The analyzed data is then formatted in such a manner amenable to storage in a database and/or a Lab Information Management System (LIMS) with no, or minimal, additional formatting.

Additional features within the scope of the present disclosure include updating default visualizations in real-time by filtering data based on a variety of criteria on demand to rapidly answer research questions, enabling on-demand access to the raw source data from a secure, centralized location, such as LIMS, via a virtual layer (e.g., Composite virtual layer), and supplying on-demand the images themselves when an operator of computing device 108 selects (e.g., hovers a pointing input device over, such as a "tool tip" feature) the corresponding numerical data on a visualization. In an embodiment, the image is rendered by way of a "tool tip" feature built in to the data analysis and visualization software (e.g., Tibco Spotfire) and directing the tool tip to render an image corresponding to data in a visualization by creating a column in the underlying data table that employs a user-defined function to render a portion of a URL specifying a fixed root directory for a server location housing an image of interest. Additionally, the image is rendered in part by using metadata from columns of the subject underlying data table corresponding to one or more of the Experiment, Treatment, Plant, or Leaf contained in the image filename to complete generation of a URL specifying display of the image corresponding to the same combination of one or more Experiment, Treatment, Plant, or Leaf as the subject data in the visualization upon the user hovering a pointing device over the subject data in the visualization. In an aspect, the scripts described herein that automate the image analysis processes utilize minimal user input due to thresholding and target selection processes varying slightly from image to image. One of ordinary skill in the art will understand that complete script automation with hard-coded values or values relative to the image of interest are within the scope of the present disclosure. Moreover, a script that identifies new images saved in a target location and applies the analysis processes automatically in real-time as they are captured is within the scope of the present disclosure. Furthermore, complete or semi-automation of the image capture process (e.g., through engineering additions, robotic capabilities, etc.) are also within the scope of the present disclosure.

Exemplary and non-limiting applications of the techniques described herein include:

Quantitative readout (e.g., percentage of total area affected) from screening BioDirect formulations or transgenes to down-regulate or up-regulate target genes of interest resulting in a visible phenotype in various plant species, resulting in the ability to prioritize similarly-performing formulations or transgenes for follow-up optimization experiments.

Detection of pathogen presence and percent affected area on plant leaves including, but not limited to, *Nicotiana tabaccum* leaves.

Target microbial organism identification and colony count, on bacterial plates, including, but not limited to, *Xanthomonas hortorum* pv. *carotae*.

Indiscriminate bacterial colony percent area coverage to identify overgrown/unreadable bacterial plates and/or number of colonies for quantification of pathogen presence.

Counting and sizing leaves, fruits, vegetables, and/or other plant parts.

Detection of pathogens and quantitative assessment of percentage of total area affected of fruits and vegetables including, but not limited to, carrot cavity spot disease.

Collecting high density data points from a landscape, such as via satellite imagery and/or other means (e.g., Biomass, canopy coverage, etc.)

More than 300 experiments have been conducted that have tested various BioDirect formulations for delivering dsRNA triggers to silence exogenous genes, such as GFP, or endogenous genes, such as magnesium chelatase, ubiquitin, or HSP70 in *Nicotiana benthamiana* or *Solanum lycopersicum* plant seedlings using the systems and methods described herein to quantify the percentage of foliar area showing visible phenotype from suppression of the target gene as a percentage of the total leaf area, resulting in the ability to prioritize the most efficacious formulations for retesting and optimization experiments. Such relative prioritization of closely-performing formulations would be difficult or impossible without the techniques for quantitative analysis of the visible phenotypes as described herein. Moreover, the relative prioritization would be very costly to assess through use of messenger RNA (mRNA) quantification techniques, such as quantitative real-time polymerase chain reaction (qRT-PCR) or Quantigene. For example, an estimated cost, not including labor, is $1 per data point with a minimum of two data points required per individual sample (e.g., leaf). Imaging devices and techniques in accordance with the present disclosure incur only minimal operational cost from powering imaging light sources, an image capture device, and a computing device and utilizes no consumable materials.

Successful proof-of-concept experiments have been performed for:
- Identifying presence of, number of foci, and percentage of total leaf area affected by pathogen infections in tobacco leaves.
- *Xanthomonas hortorum* pv. *carotae* colony identification and colony count on bacterial plates from carrot seed lots being tested for presence and quantity of this pathogen, as well as indiscriminate measurement of colony coverage of bacterial plates to identify overgrown/unreadable.
- Identifying presence of and percentage of total area affected to develop quantitative disease score index for fungal pathogen causing bacterial carrot cavity spot disease, as well as counting number of size of both healthy and infected carrots.
- Quantification of "integrated density" (e.g., size of region of interest×brightness of color or shade, as measured by RGB value for that color channel or grayscale) for bands on a 1-D polyacrylamide gel formed from electrophoresis of individual fractions of a sucrose gradient from a protein folding reaction used as an assay to screen small-molecular chemical compounds for disruption of viral protein folding.

EXAMPLES

Figure 13:
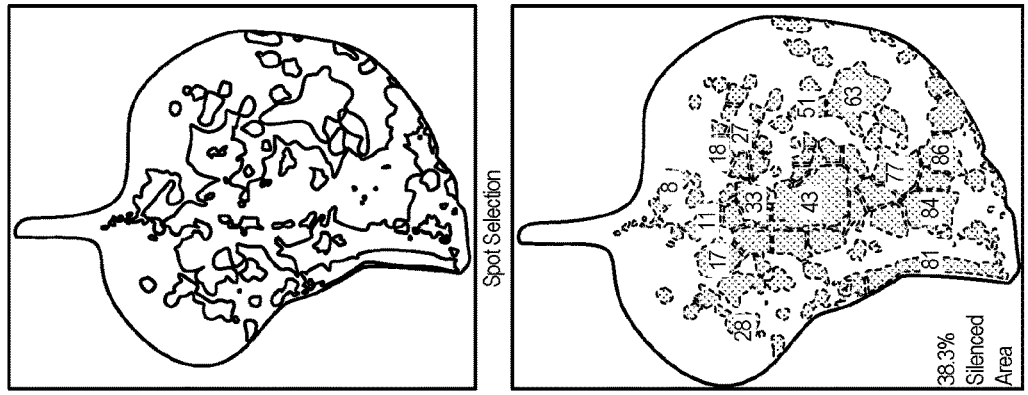
FIG. 13 illustrates an exemplary magnesium chelatase silencing spot quantification process in accordance with an embodiment.
Figure 13:
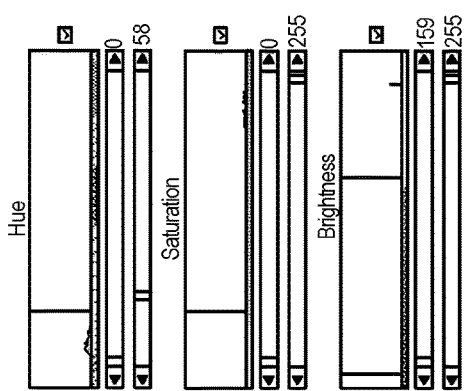
Figure 13:
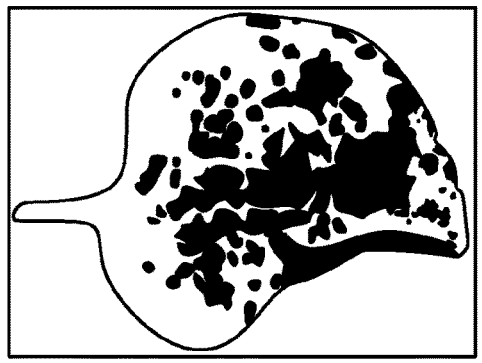
Figure 13:
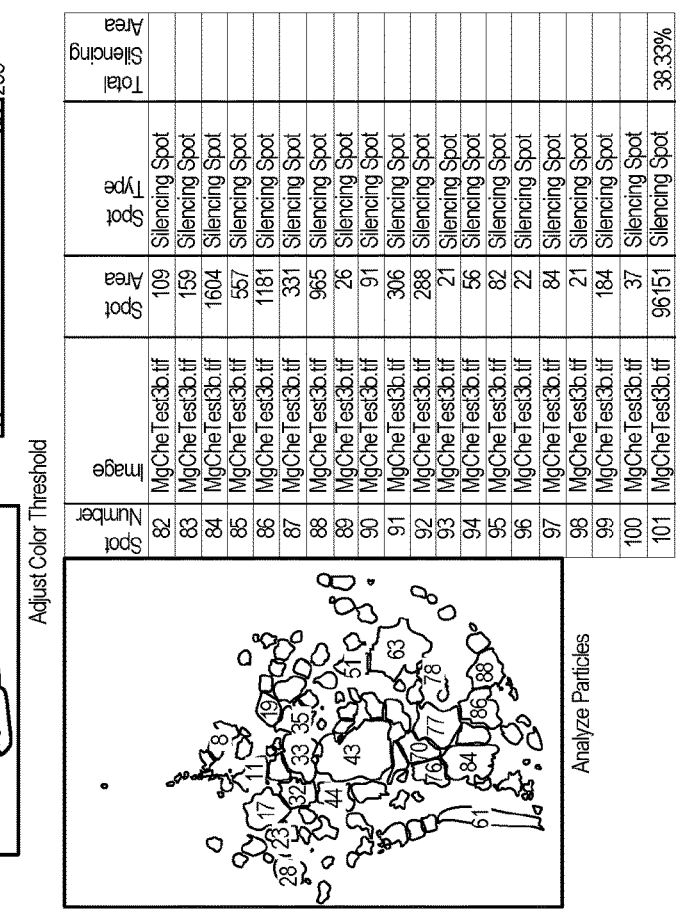
Figure 13:
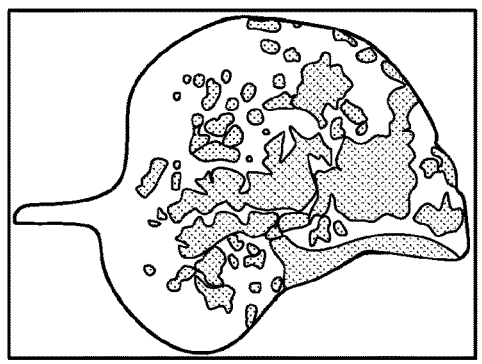
Figure 13:

FIG. 13 illustrates an exemplary magnesium chelatase silencing spot quantification process performed in accordance with the systems and methods herein.

Figure 14:
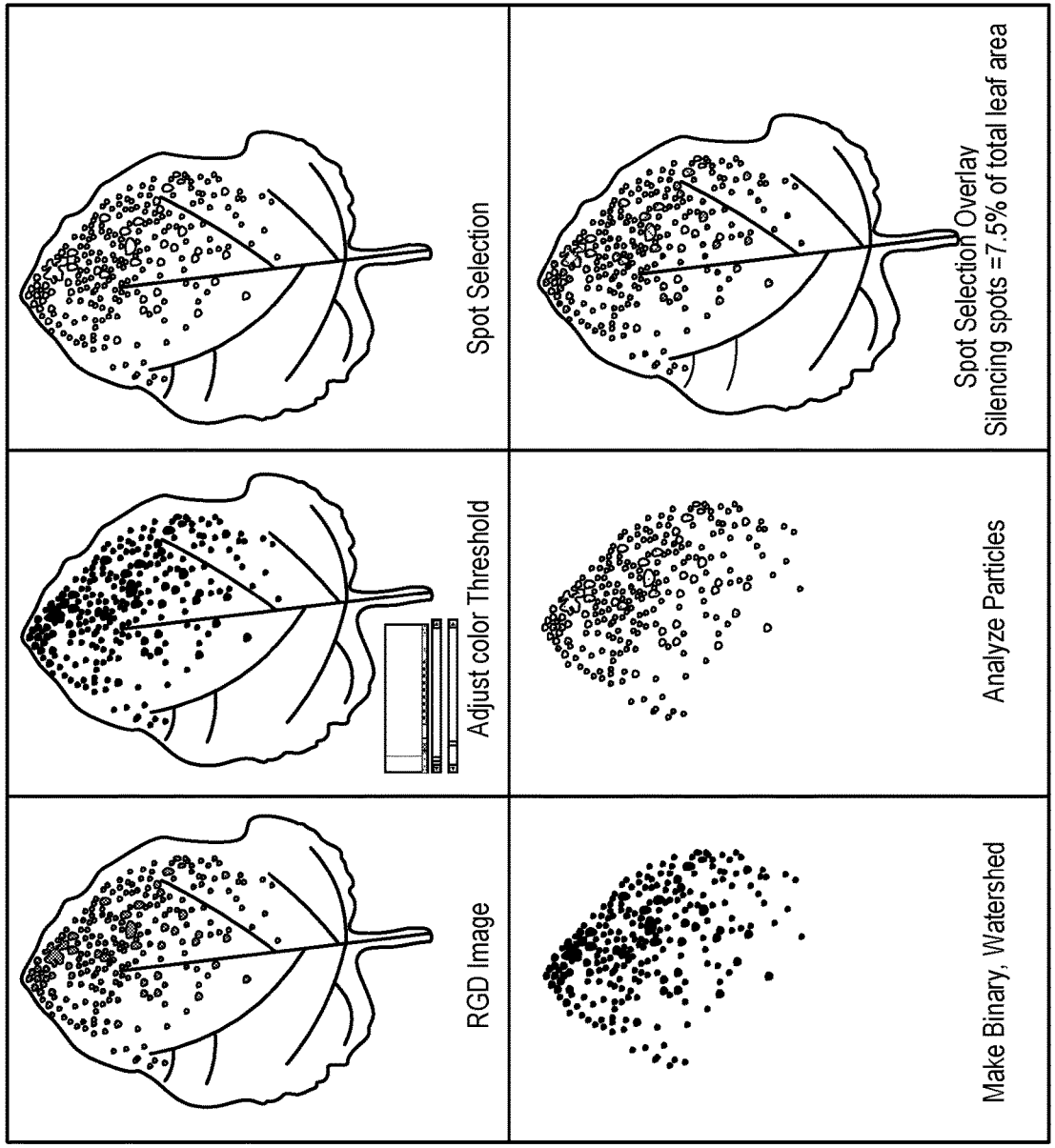
FIG. 14 illustrates an exemplary *Nicotiana benthamiana* GFP silencing spot quantification process in accordance with an embodiment.

FIG. 14 illustrates an exemplary *Nicotiana benthamiana* GFP silencing spot quantification process performed in accordance with the systems and methods herein.

Figure 15:
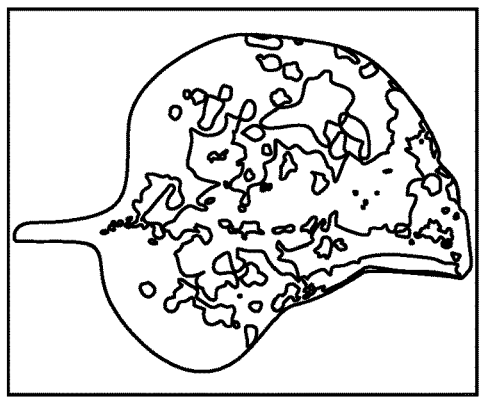
FIG. 15 illustrates an exemplary *Nicotiana benthamiana* magnesium chelatase silencing spot quantification process in accordance with an embodiment.
Figure 15:
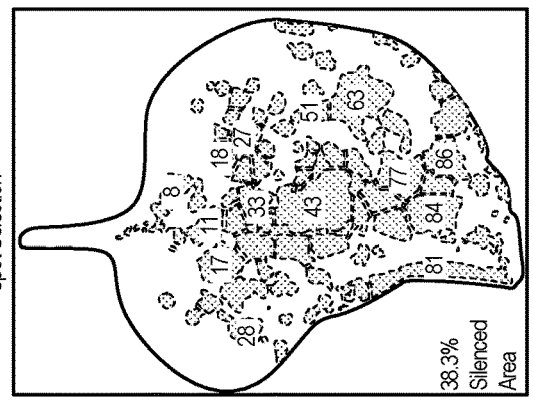
Figure 15:
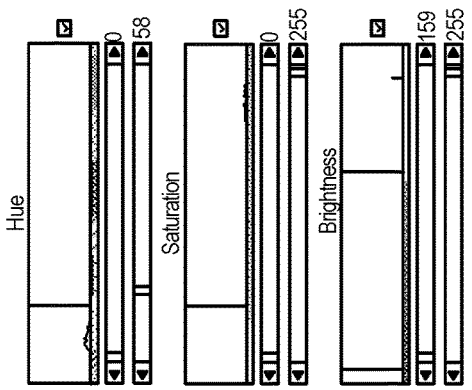
Figure 15:
Figure 15:
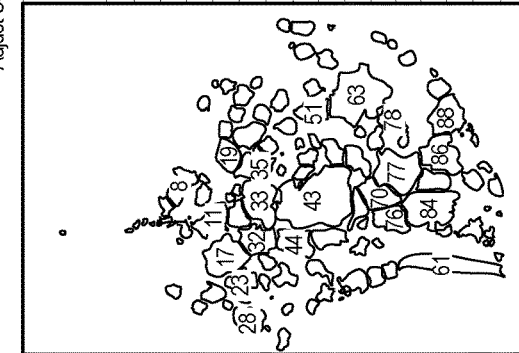
Figure 15:
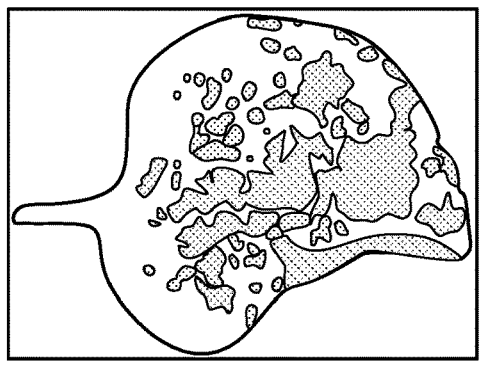
Figure 15:
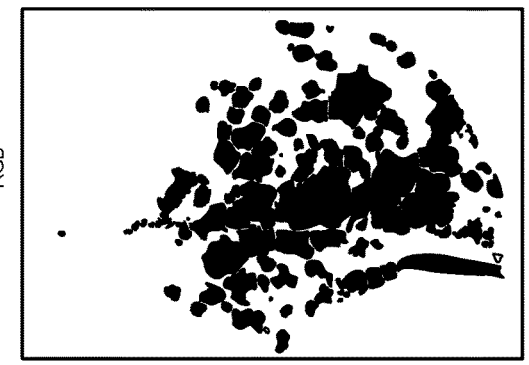

FIG. 15 illustrates an exemplary *Nicotiana benthamiana* magnesium chelatase silencing spot quantification process performed in accordance with the systems and methods herein.

Figure 16:
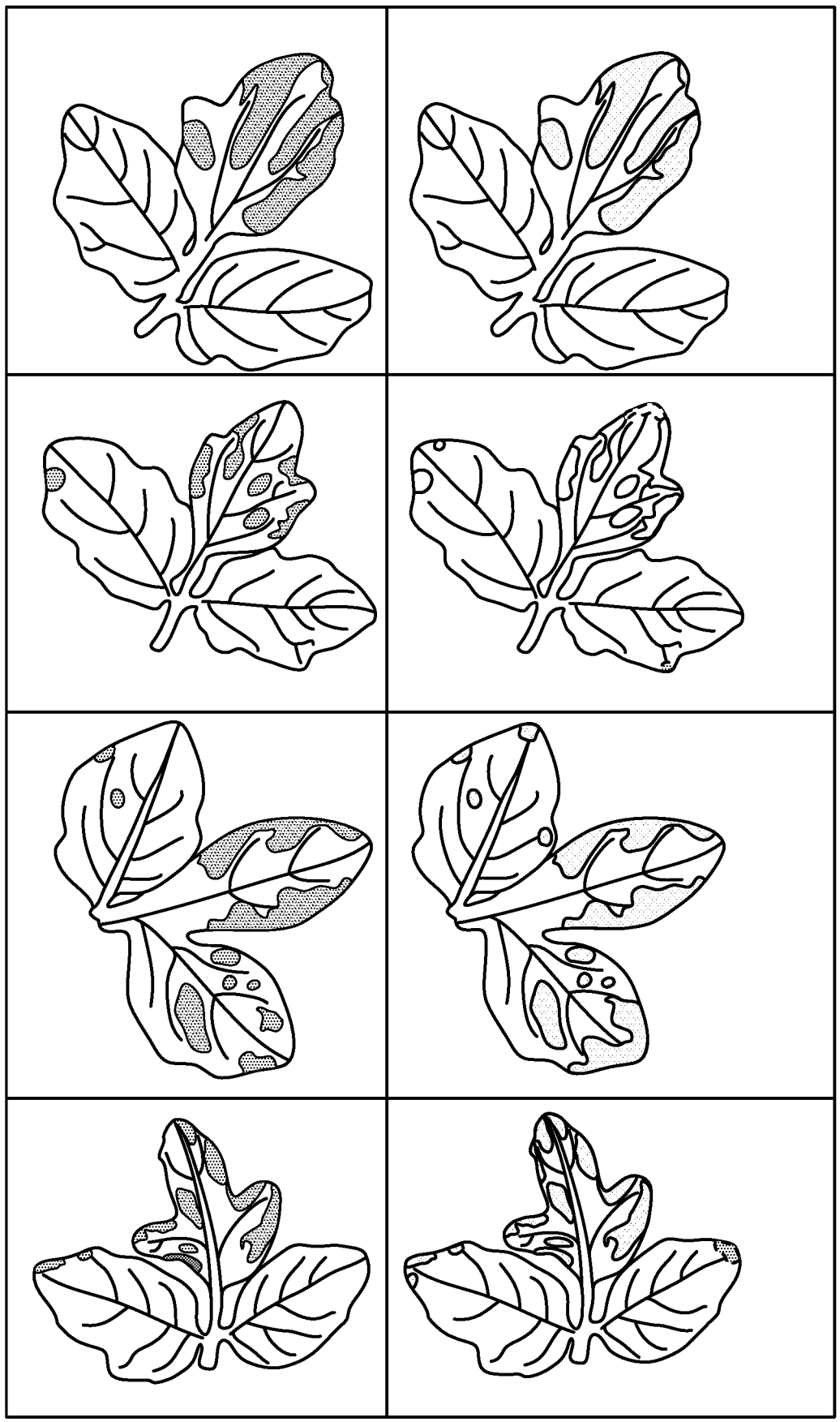
FIG. 16 illustrates an exemplary *Solanum lycopersicum* Magnesium Cheletase silencing spot quantification output in accordance with an embodiment.

FIG. 16 illustrates an exemplary *Solanum lycopersicum* Magnesium Cheletase silencing spot quantification output generated in accordance with the systems and methods herein. The top row contains original images and the bottom row contains silencing spot quantification images.

Figure 17:
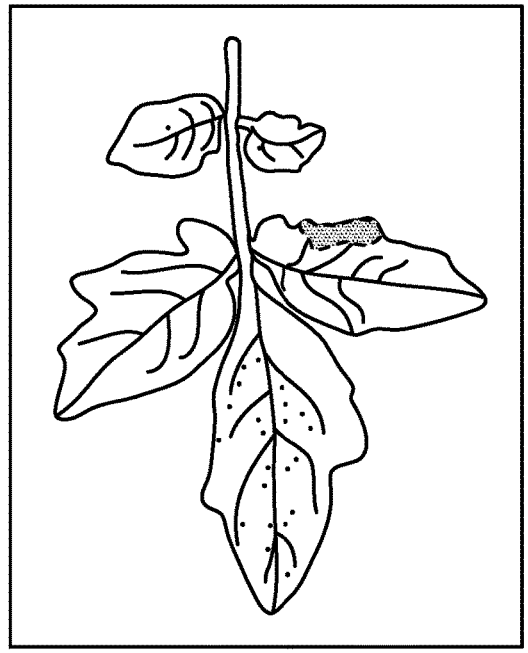
FIG. 17 illustrates an exemplary *Solanum lycopersicum* GFP silencing spot quantification in accordance with an embodiment.
Figure 17:
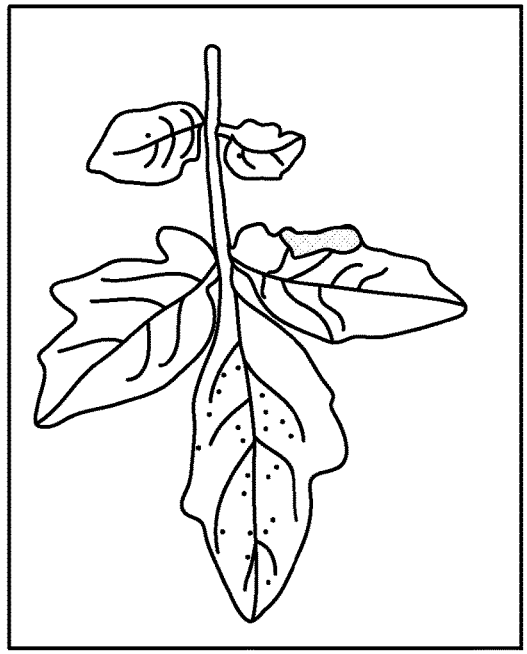
Figure 17:
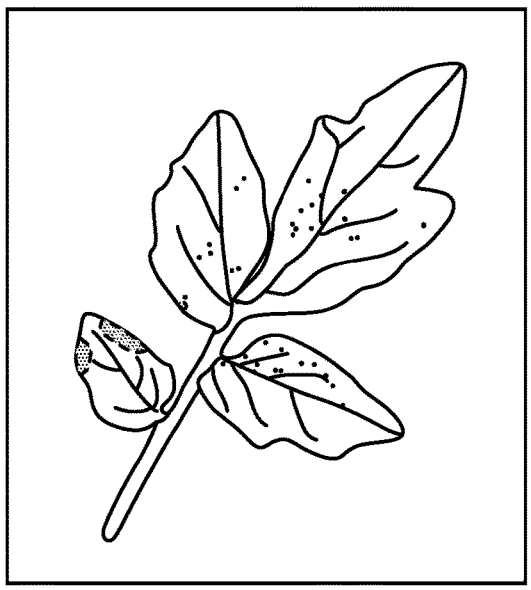
Figure 17:
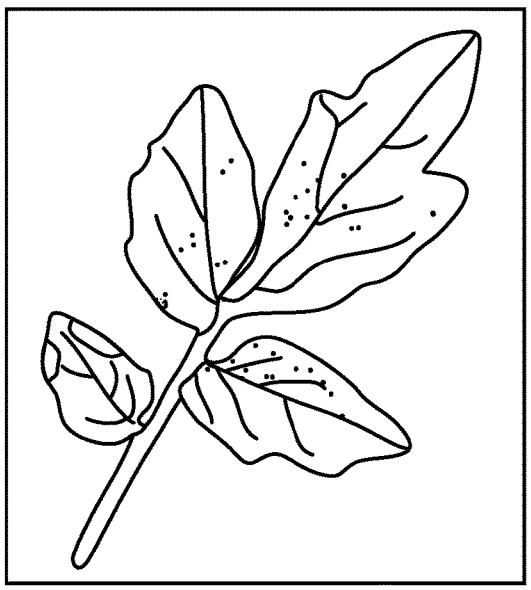

FIG. 17 illustrates an exemplary *Solanum lycopersicum* GFP silencing spot quantification performed in accordance with the systems and methods herein. The top row contains original images and the bottom row contains silencing spot quantification images.

Figure 18:
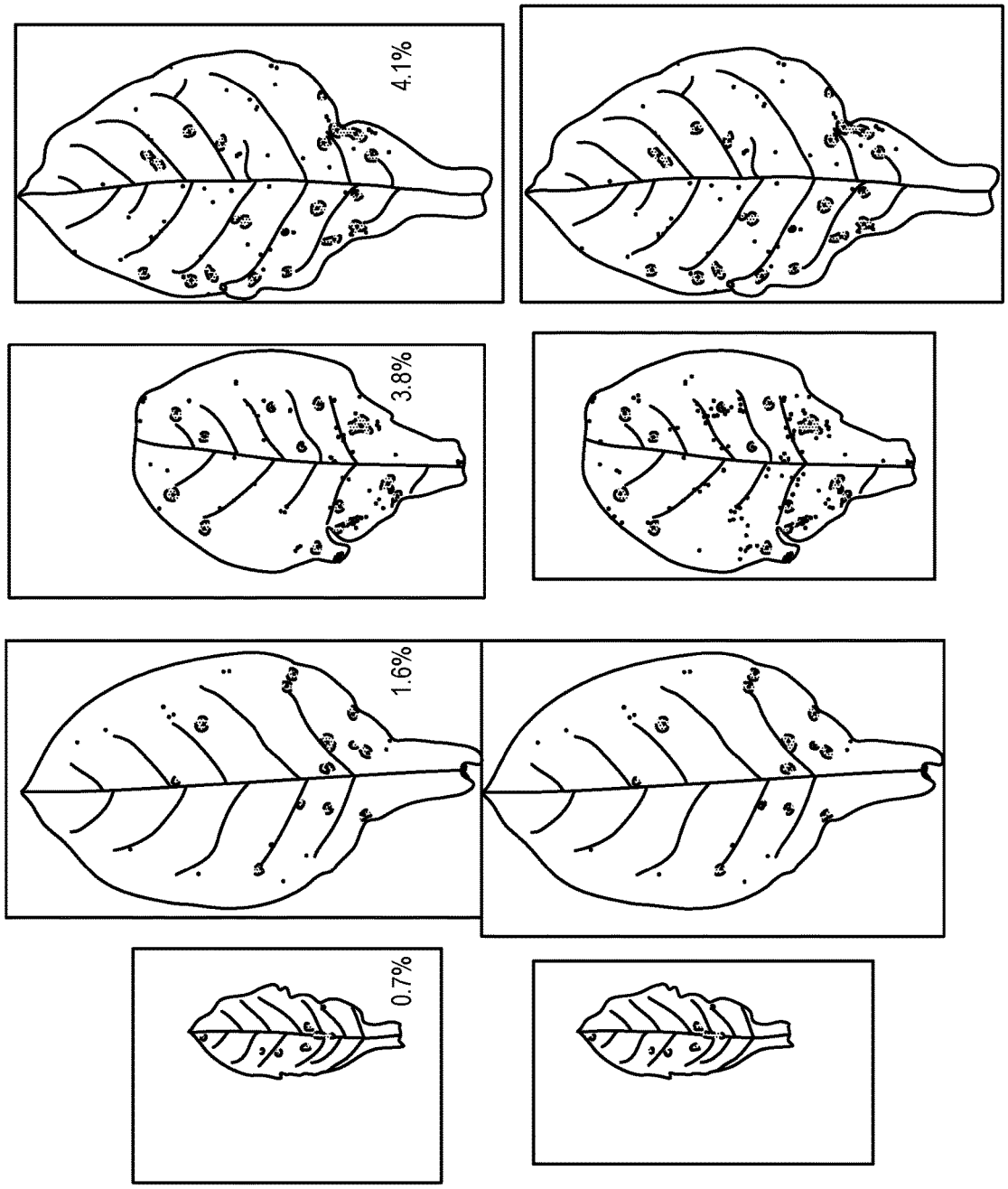
FIG. 18 illustrates an exemplary *Nicotiana tabaccum* pathogen identification and quantification in accordance with an embodiment.

FIG. 18 illustrates an exemplary *Nicotiana tabaccum* pathogen identification and quantification performed in accordance with the systems and methods herein. The top row of images using LAB color space for spot area measurement and the bottom row of images using HSB color space for spot area measurement.

Figure 19:
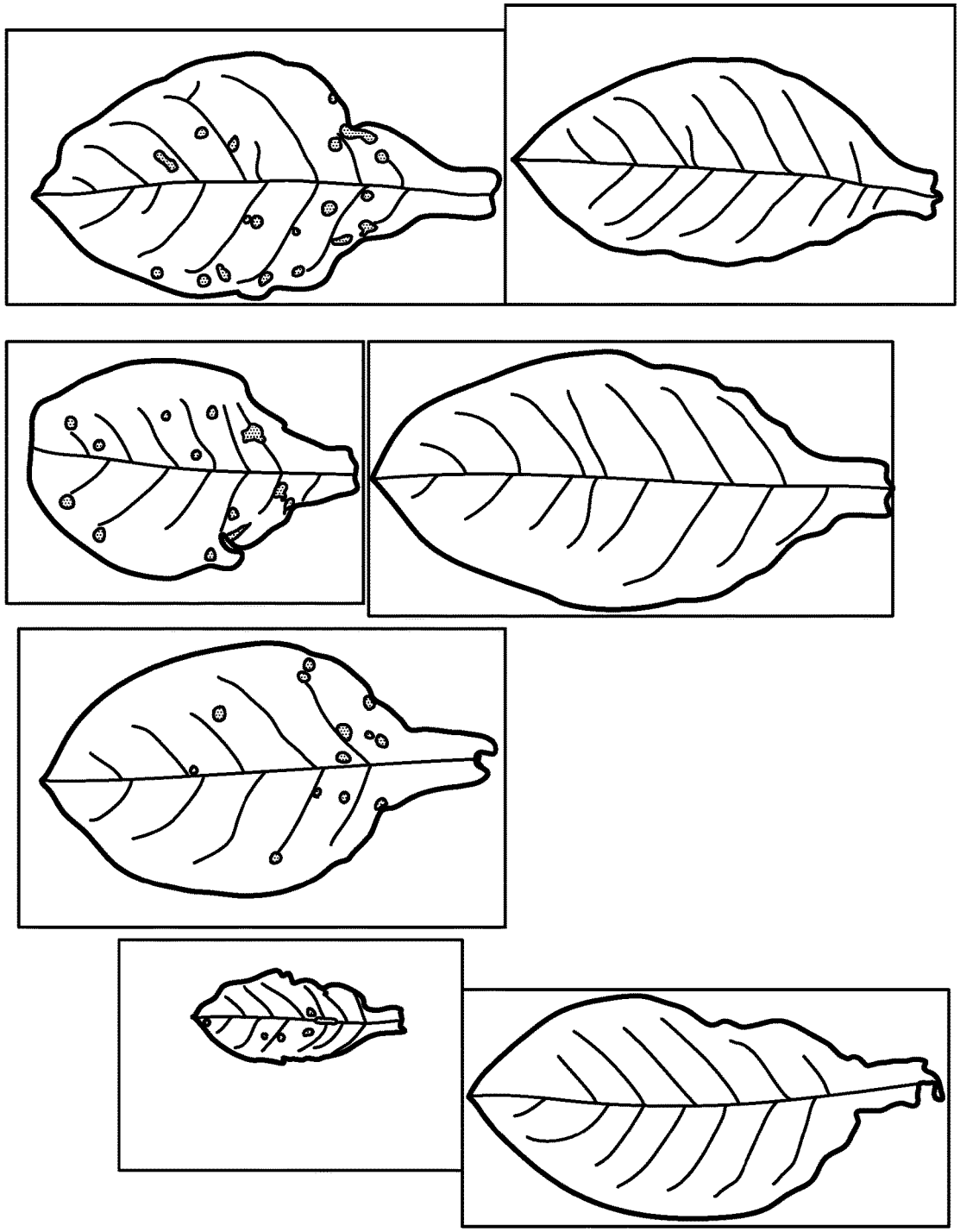
FIG. 19 illustrates an exemplary *Nicotiana tabaccum* leaf area measurement in accordance with an embodiment.

FIG. 19 illustrates an exemplary *Nicotiana tabaccum* leaf area measurement performed in accordance with the systems and methods herein. The top row of images showing the leaf area measurement, illustrated with a thicker exterior leaf boarder, for inflected leaves. The bottom row of images showing the leaf area measurement, illustrated with a thicker exterior leaf boarder, for healthy leaves.

Figure 20:
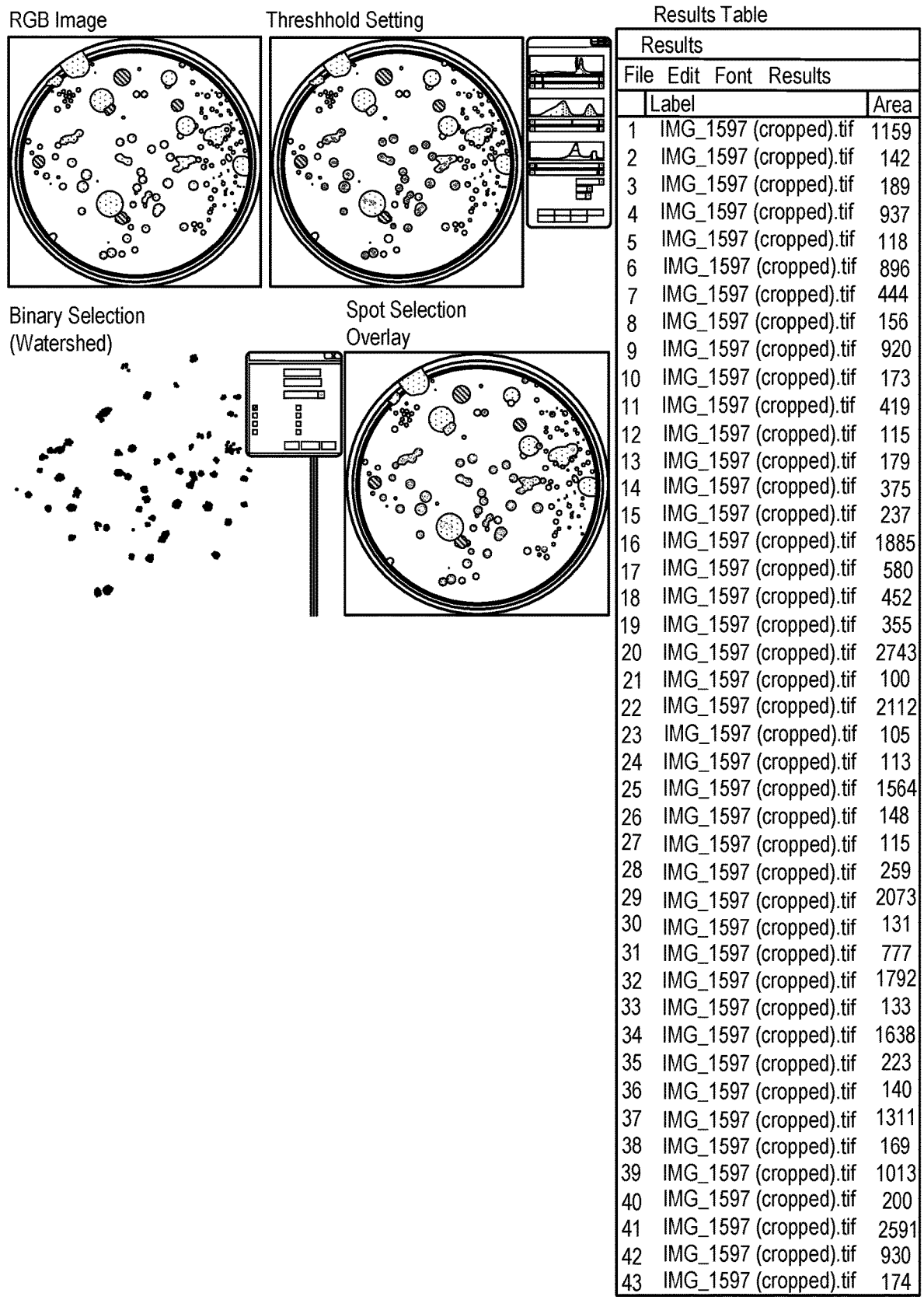
FIG. 20 illustrates an exemplary *Xanthomonas hortorum* pv. *carotae* bacterial plate colony identification in accordance with an embodiment.

FIG. 20 illustrates an exemplary *Xanthomonas hortorum* pv. *carotae* bacterial plate colony identification performed in accordance with the systems and methods herein.

Figure 21:
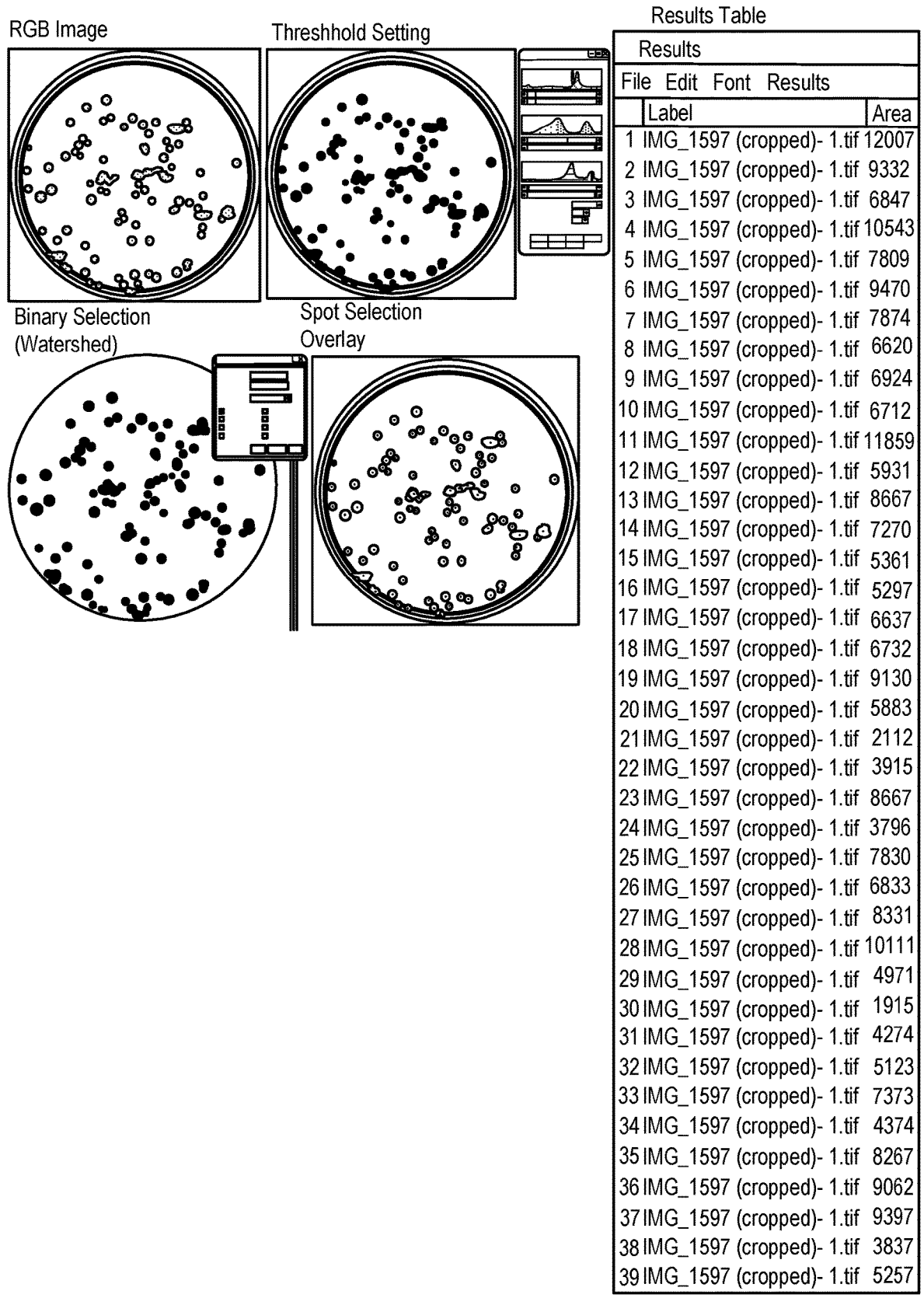
FIG. 21 illustrates an exemplary *Xanthomonas hortorum* pv. *carotae* bacterial plate colony count in accordance with an embodiment.

FIG. 21 illustrates an exemplary *Xanthomonas hortorum* pv. *carotae* bacterial plate colony count performed in accordance with the systems and methods herein.

Figure 22:
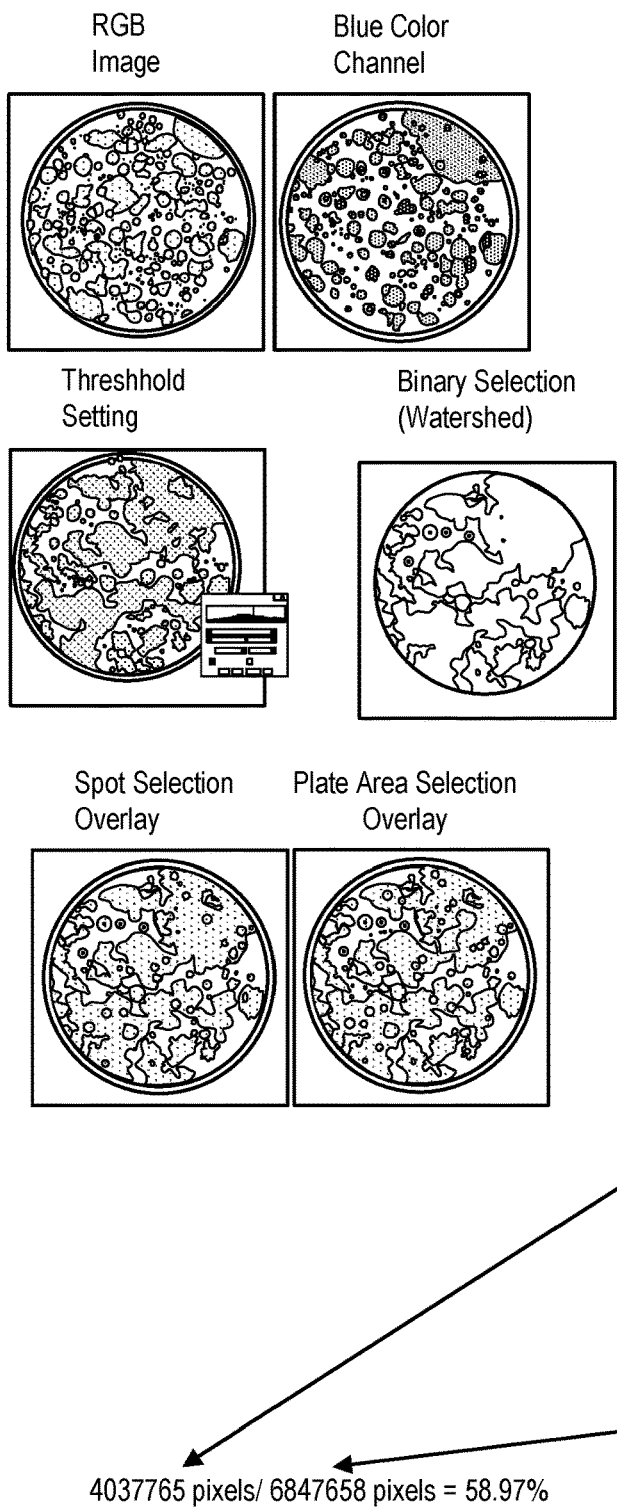
FIG. 22 illustrates an exemplary overgrown bacterial plate identification in accordance with an embodiment.

FIG. 22 illustrates an exemplary overgrown bacterial plate identification performed in accordance with the systems and methods herein.

Figure 23:
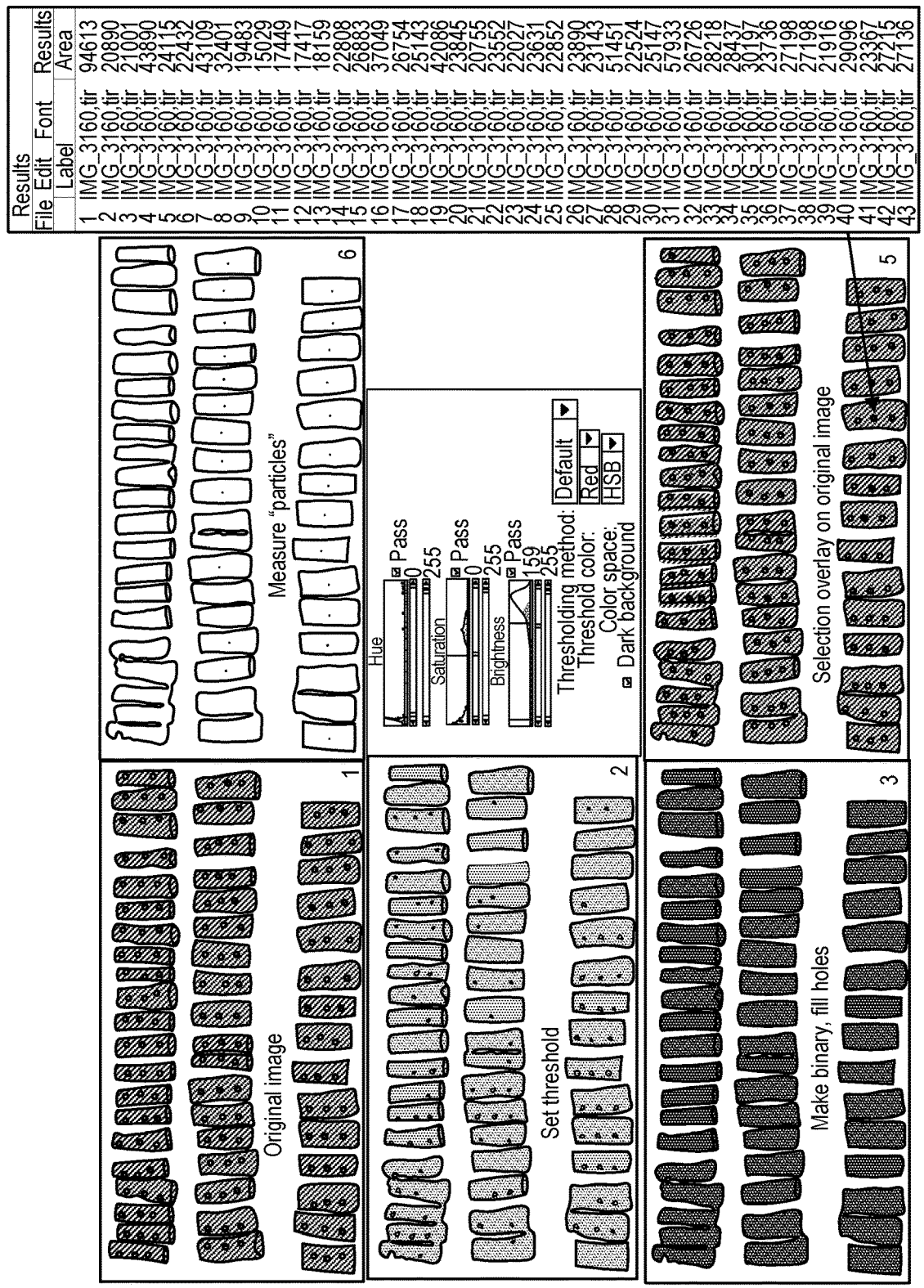
FIG. 23 illustrates an exemplary carrot count and size quantification process in accordance with an embodiment.

FIG. 23 illustrates an exemplary carrot count and size quantification process performed in accordance with the systems and methods herein. The number of carrots and relative area of each can be recorded in a table, with each data entry (e.g., row) corresponding to one carrot (when the carrots can be separated).

Figure 24:
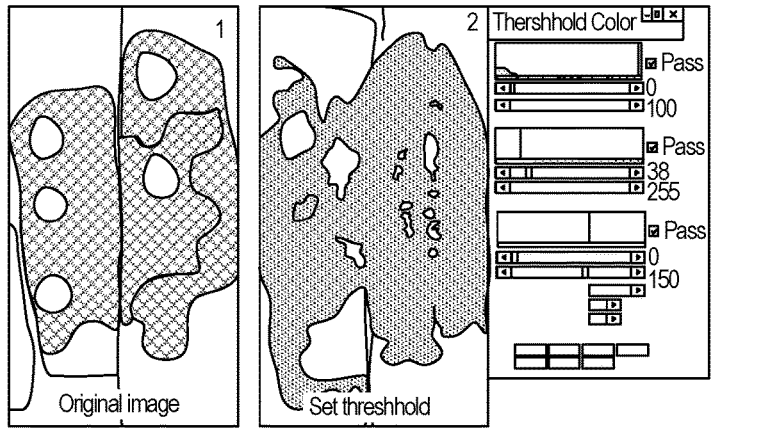
FIG. 24 illustrates an exemplary carrot cavity spot disease scoring process in accordance with an embodiment.
Figure 24:
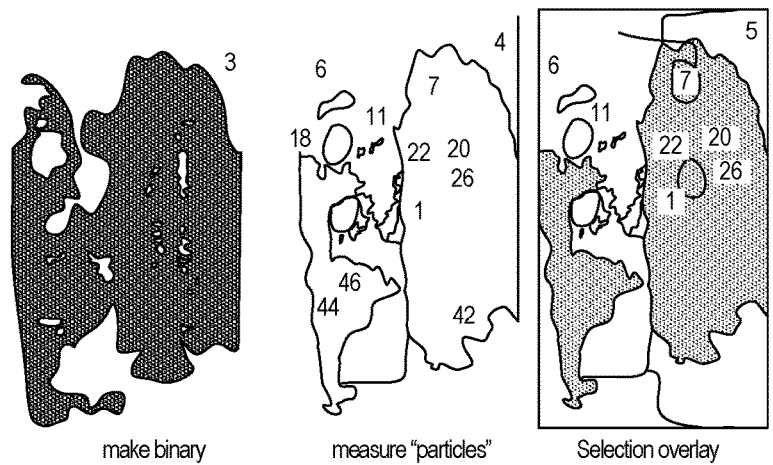

FIG. 24 illustrates an exemplary carrot cavity spot disease scoring process performed in accordance with the systems and methods herein. The number of diseased areas, as determined by the systems and methods described herein, and relative area of each can be recorded in a table, with each data entry (e.g., row) corresponding to one diseased area.

Computing Environment

In addition to the embodiments described above, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network (e.g., Pipeline Pilot, GitHub, Amazon Web Services (AWS), Domino, etc.). In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, imaging device (e.g., camera), or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs (e.g., Pipeline Pilot, GitHub, Amazon Web Services (AWS), Domino, etc.). Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An imaging system, comprising:
   a frame assembly;
   a light source mechanically coupled to the frame assembly, the light source configured to illuminate organisms;
   an imaging device mechanically coupled to the frame assembly, the imaging device configured to capture at least one image of the illuminated organisms; and
   at least one processor communicatively coupled to the imaging device, the at least one processor configured to:
   automatically parse the at least one image by executing a script that parses a single image of the at least one image into a plurality of parsed images each including only one of the organisms; and
   quantitatively analyze one or more phenotypes of the organisms that are visible within the plurality of parsed images.

2. The imaging system of claim 1, wherein the quantitative analysis is at least semi-automated.

3. The imaging system of claim 1, wherein the organisms include at least one of plant organisms and bacterial organisms.

4. The imaging system of claim 3, wherein the plant organisms include at least one of: plant tissue, a plant leaf, a Nicotiana benthamiana leaf, a Solanum lycopersicum leaf, a Nicotiana tabaccum leaf, bacteria, Xanthomonas hortorum pv. carolae, vegetables, and protein gel bands.

5. The imaging system of claim 1, further comprising a template configured to support the organisms during the image capturing.

6. The imaging system of claim 5, wherein the template includes evenly-spaced row and column gridlines to enable capturing images of a plurality of the organisms in a single image.

7. The imaging system of claim 1, wherein the light source includes at least one light-emitting diode (LED) configured to emit light having a generally blue color.

8. The imaging system of claim 7, wherein the at least one LED is configured to emit the light having a generally blue color at an intensity sufficient to excite in planta green fluorescent protein (GFP).

9. The imaging system of claim 8, wherein the intensity of light emitted by the at least one LED is up to 3000 microEinsteins.

10. The imaging system of claim 1, wherein exposure and white balance settings of the imaging device during the capturing of the at least one image are the same as the exposure and white balance settings of the imaging device during capturing of at least one other image of the organisms, enabling a quantitative comparison of the captured images utilizing image thresholding based on at least one of brightness or color.

11. The imaging system of claim 1, wherein the at least one processor is configured to quantitatively analyze the organism phenotypes by automatically measuring a total area of the organism visible in each of the parsed images, automatically quantifying silencing spots within each of the parsed images, and automatically analyzing and summarizing metrics describing properties of the organism visible in each of the parsed images.

12. The imaging system of claim 1, wherein the captured at least one image includes a barcode including metadata describing a treatment of at least one of the organisms included in the captured at least one image.

13. The imaging system of claim 12, wherein the at least one processor is configured to store the captured at least one image on a computer-readable storage device communicatively coupled thereto, and wherein the at least one processor is configured to automatically organize the stored at least one image on the computer-readable storage device by generating a title for the at least one image that includes the metadata included in the barcode thereof.

14. A method, comprising:
   illuminating, via a light source including at least one light-emitting diode (LED), an organism with light having a generally blue color and an intensity sufficient to excite green fluorescent protein (GFP);
   capturing, via an imaging device, at least one image of the illuminated organism; and
   quantitatively analyzing, via at least one processor, one or more phenotypes of the organism that are visible within the at least one captured image of the organism.

15. The method of claim 14, further comprising locating the organism upon a template during said illuminating and capturing.

16. The method set forth in claim 14, wherein the at least one captured image includes multiple captured images; and
   wherein the quantitatively analyzing comprises automatically organizing the multiple captured images, automatically parsing the organized images, automatically measuring a total area of the organism visible in the organized images, automatically quantifying silencing spots within the images of the organism, and automatically analyzing and summarizing metrics describing properties of the organism.

17. A bacterial organism imaging system, comprising:
a frame assembly;
a light source mechanically coupled to the frame assembly, the light source configured to illuminate a colony of one or more bacterial organisms;
an imaging device mechanically coupled to the frame assembly, the imaging device configured to capture at least one image of the illuminated bacterial organism colony; and
at least one processor communicatively coupled to the imaging device, the at least one processor configured to automatically quantify silencing spots within the at least one image, in order to at least one of:
identify the bacterial organisms of the colony that are visible within the at least one captured image of the colony, and/or
determine a count of a total number of bacterial organisms of the colony that are visible within the at least one captured image of the bacterial organism colony.

18. An imaging system, comprising:
a frame assembly;
a light source mechanically coupled to the frame assembly and configured to illuminate an organism, the light source including at least one light-emitting diode (LED) configured to emit light having a generally blue color and having an intensity sufficient to excite green fluorescent protein (GFP) in the organism;
an imaging device mechanically coupled to the frame assembly, the imaging device configured to capture at least one image of the illuminated organism; and
at least one processor communicatively coupled to the imaging device, the at least one processor configured to quantitatively analyze one or more phenotypes of the organism that are visible within the at least one captured image of the organism.

19. An imaging system, comprising:
a frame assembly;
a light source mechanically coupled to the frame assembly, the light source configured to illuminate an organism;
an imaging device mechanically coupled to the frame assembly, the imaging device configured to capture at least one image of the illuminated organism; and
at least one processor communicatively coupled to the imaging device, the at least one processor configured to quantitatively analyze one or more phenotypes of the organism that are visible within the at least one captured image of the organism;
wherein exposure and white balance settings of the imaging device during the capturing of the at least one image are the same as the exposure and white balance settings of the imaging device during capturing of at least one other image of the organism, enabling a quantitative comparison of the captured images utilizing image thresholding based on at least one of brightness and/or color.

20. An imaging system, comprising:
a frame assembly;
a light source mechanically coupled to the frame assembly, the light source configured to illuminate an organism;
an imaging device mechanically coupled to the frame assembly, the imaging device configured to capture at least one image of the illuminated organism, the captured at least one image including a barcode comprising metadata describing a treatment of the organism; and
at least one processor communicatively coupled to the imaging device, the at least one processor configured to quantitatively analyze one or more phenotypes of the organism that are visible within the at least one captured image of the organism.

21. A method, comprising:
illuminating, via a light source, an organism;
capturing, via an imaging device, at least one image of the illuminated organism; and
quantitatively analyzing, via at least one processor, one or more phenotypes of the organism that are visible within the at least one image of the organism, by:
automatically organizing the at least one image, automatically parsing the at least one image, automatically measuring a total area of the organism visible in the parsed at least one image, automatically quantifying silencing spots within the parsed at least one image, and automatically analyzing and summarizing metrics describing properties of the organism.

* * * * *